US008405913B2

(12) United States Patent
Maeda

(10) Patent No.: US 8,405,913 B2
(45) Date of Patent: Mar. 26, 2013

(54) ANAMORPHIC PROJECTION OPTICAL SYSTEM

(75) Inventor: Patrick Y. Maeda, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 20 days.

(21) Appl. No.: 13/216,976

(22) Filed: Aug. 24, 2011

(65) Prior Publication Data

US 2013/0050842 A1 Feb. 28, 2013

(51) Int. Cl.
*G02B 13/08* (2006.01)
(52) U.S. Cl. ........................................ 359/649; 359/668
(58) Field of Classification Search .......... 359/649–651, 359/668–671
See application file for complete search history.

(56) References Cited

U.S. PATENT DOCUMENTS

| | | | | |
|---|---|---|---|---|
| 3,800,699 | A | 4/1974 | Carley | |
| 5,754,217 | A * | 5/1998 | Allen | 347/239 |
| 5,953,152 | A | 9/1999 | Hewlett | |
| 5,954,424 | A * | 9/1999 | Anderson et al. | 362/242 |
| 6,121,984 | A | 9/2000 | Anderson | |
| 6,567,217 | B1 | 5/2003 | Kowarz et al. | |
| 6,606,739 | B2 | 8/2003 | Kanatake et al. | |
| 7,048,388 | B2 | 5/2006 | Takaura et al. | |
| 7,218,380 | B2 | 5/2007 | De Jager | |
| 7,508,570 | B1 | 3/2009 | Meisburger | |
| 8,031,390 | B2 | 10/2011 | Grasser et al. | |
| 8,104,901 | B2 | 1/2012 | Kwon | |
| 8,282,221 | B2 | 10/2012 | Arai et al. | |
| 2008/0062390 | A1 | 3/2008 | Zhang et al. | |
| 2010/0208329 | A1* | 8/2010 | Sandstrom et al. | 359/291 |

* cited by examiner

*Primary Examiner* — Scott J Sugarman
(74) *Attorney, Agent, or Firm* — Bever, Hoffman & Harms, LLP; Patrick T. Bever

(57) ABSTRACT

An anamorphic projection optical system is disclosed that takes in a relatively low intensity two-dimensional light field, and anamorphically images and concentrates the light field to generate a substantially one-dimensional, high intensity line image extending in a process direction on an imaging surface. The optical system includes a process-direction optical subsystem formed by one or more cylindrical/acylindrical lenses in an all-refractive arrangement, or a combination of cylindrical/acylindrical lenses and mirrors to generate the line image with sufficient energy, for example, to evaporate fountain solution from the imaging surface. The anamorphic optical system also includes a cross-process-direction optical subsystem formed by one or more cylindrical/acylindrical lenses and an optional cylindrical/acylindrical field lens to image the modulated light field in the cross-process direction. The anamorphic projection optical system facilitates simultaneously generating multiple pixel images of the line image, thus facilitating a printing at 1200 dpi or greater.

18 Claims, 13 Drawing Sheets

ANAMORPHIC PROJECTION OPTICAL SYSTEM

FIELD OF THE INVENTION

This invention relates to optical systems utilized, for example, in high speed printers, and in particular to anamorphic projection optical systems.

BACKGROUND OF THE INVENTION

Laser imaging systems are extensively used to generate images in applications such as xerographic printing, mask and maskless lithographic patterning, laser texturing of surfaces, and laser cutting machines. Laser printers often use a raster optical scanner (ROS) that sweeps a laser perpendicular to a process direction by utilizing a polygon or galvo scanner, whereas for cutting applications lasers imaging systems use flatbed x-y vector scanning.

One of the limitations of the laser ROS approach is that there are design tradeoffs between image resolution and the lateral extent of the scan line. These tradeoffs arise from optical performance limitations at the extremes of the scan line such as image field curvature. In practice, it is extremely difficult to achieve 1200 dpi resolution across a 20" imaging swath with single galvanometers or polygon scanners. Furthermore, a single laser head motorized x-y flatbed architecture, ideal for large area coverage, is too slow for most high speed printing processes.

For this reason, monolithic light emitting diode (LED) arrays of up to 20" in width have an imaging advantage for large width xerography. Unfortunately, present LED array are only capable of offering 10 milliWatt power levels per pixel and are therefore only useful for some non-thermal imaging applications such as xerography. In addition, LED bars have differential aging and performance spread. If a single LED fails it requires the entire LED bar be replaced. Many other imaging or marking applications require much higher power. For example, laser texturing, or cutting applications can require power levels in the 10 W-100 W range. Thus LED bars cannot be used for these high power applications. Also, it is difficult to extend LEDs to higher speeds or resolutions above 1200 dpi without using two or more rows of staggered heads.

Higher power semiconductor laser arrays in the range of 100 mW-100 Watts do exist. Most often they exist in a 1D array format such as on a laser diode bar often about 1 cm in total width. Another type of high power directed light source are 2D surface emitting VCSEL arrays. However, neither of these high power laser technologies allow for the laser pitch between nearest neighbors to be compatible with 600 dpi or higher imaging resolution. In addition, neither of these technologies allow for the individual high speed control of each laser. Thus high power applications such as high power overhead projection imaging systems, often use a high power source such as a laser in combination with a spatial light modulator such as a DLP™ chip from Texas Instruments or liquid crystal arrays.

Prior art has shown that if imaging systems are arrayed side by side, they can be used to form projected images that overlap wherein the overlap can form a larger image using software to stitch together the image patterns into a seamless pattern. This has been shown in many maskless lithography systems such as those for PC board manufacturing as well as for display systems. In the past such arrayed imaging systems for high resolution applications have been arranged in such a way that they must use either two rows of imaging subsystems or use a double pass scanning configuration in order to stitch together a continuous high resolution image. This is because of physical hardware constraints on the dimensions of the optical subsystems. The double imaging row configuration can still be seamlessly stitched together using a conveyor to move the substrate in single direction but such a system requires a large amount of overhead hardware real estate and precision alignment between each imaging row.

For the maskless lithography application, the time between exposure and development of photoresist to be imaged is not critical and therefore the imaging of the photoresist along a single line does not need be exposed at once. However, sometimes the time between exposure and development is critical. For example, xerographic laser printing is based on imaging a photoreceptor by erasing charge which naturally decays over time. Thus the time between exposure and development is not time invariant. In such situations, it is desirable for the exposure system to expose a single line, or a few tightly spaced adjacent lines of high resolution of a surface at once.

In addition to xerographic printing applications, there are other marking systems where the time between exposure and development are critical. One example is the laser based variable data lithographic marking approach originally disclosed by Carley in U.S. Pat. No. 3,800,699 entitled, "FOUNTAIN SOLUTION IMAGE APPARATUS FOR ELECTRONIC LITHOGRAPHY". In standard offset lithographic printing, a static imaging plate is created that has hydrophobic imaging and hydrophilic non-imaging regions. A thin layer of water based dampening solution selectively wets the plate and forms an oleophobic layer which selectively rejects oil-based inks. In variable data lithographic marking disclosed in U.S. Pat. No. 3,800,699, a laser can be used to pattern ablate the fountain solution to form variable imaging regions on the fly. For such a system, a thin layer of dampening solution also decays in thickness over time, due to natural partial pressure evaporation into the surrounding air. Thus it is also advantageous to form a single continuous high power laser imaging line pattern formed in a single imaging pass step so that the liquid dampening film thickness is the same thickness everywhere at the image forming laser ablation step. However, for most arrayed high power high resolution imaging systems, the hardware and packaging surrounding a spatial light modulator usually prevent a seamless continuous line pattern to be imaged. Furthermore, for many areas of laser imaging such as texturing, lithography, computer to plate making, large area die cutting, or thermal based printing or other novel printing applications, what is needed is laser based imaging approach with high total optical power well above the level of 1 Watt that is scalable across large process widths in excess of 20" as well as having achievable resolution greater than or equal to 600 dpi, pixel positioning resolution or addressability greater than or equal to 1200 dpi and allows high resolution high speed imaging in a single pass.

SUMMARY OF THE INVENTION

The present invention is directed to an anamorphic optical system that anamorphically images and concentrates a relatively low intensity two-dimensional light field in order to form a substantially one-dimensional high intensity line image that is aligned in a cross-process (e.g., horizontal) direction on an imaging surface. In an exemplary embodiment, the two-dimensional modulated light field is made up of low-intensity light portions that effectively form a "stretched" line image in which each dot-like "pixel" (image portion) of the line image is expanded in the process (e.g., vertical) direction. The anamorphic optical system utilizes one or more elongated curved optical elements (e.g., cylindrical/acylindrical lenses and/or cylindrical/acylindrical mirrors) that are operably positioned and arranged to image and concentrate the two-dimensional modulated light field such that the one-dimensional line image is projected onto the imaging surface. That is, the operable optical (i.e., reflective or refractive) surface of the elongated (cylindrical/acylindrical) optical element has a constant curved profile centered along the neutral or zero-power axis, whereby light concentrated by the elongated optical element is equally concentrated on the imaging surface along the entire length of the line. By utilizing the anamorphic optical system to concentrate the low-intensity modulated light field, high total optical intensity (i.e., flux density on the order of hundreds of Watts/$cm^2$) is generated simultaneously generated along the entire length of the line image, whereby every dot-like pixel image is generated at the same time (i.e., as compared with a rastering system that only applies high power to one point of a line image at any given instant). By simultaneously generating the entire high-intensity line image, the present invention facilitates a reliable yet high power imaging system that can be used, for example, for single-pass high resolution high speed printing applications.

According to alternative embodiments of the present invention, an anamorphic optical system is implemented either entirely using process-direction cylindrical/acylindrical refractive optical elements, or using a catadioptric system including one or more process-direction cylindrical/acylindrical reflective (e.g., mirror) optical elements. In the all-refractive optical system embodiments, either one focusing lens or two focusing lenses having cylindrical or acylindrical refractive surfaces is/are utilized to concentrate the two-dimensional modulated light field in the process direction onto the imaging surface. In the catadioptric anamorphic optical system embodiments, either one focusing mirror or two focusing mirrors having cylindrical or acylindrical reflective surfaces is/are utilized to concentrate the two-dimensional modulated light field in the process direction onto the imaging surface. Due to process direction distortion, the catadioptric anamorphic projection optical system is more suitable for imaging systems where the two-dimensional light field is much wider in the cross-process direction than in the process direction. The catadioptric anamorphic optical system architecture also provides a lower level of sagittal field curvature in the cross-process direction than that of the all-refractive system, thereby facilitating the imaging of a square or rectangular input light field.

According to an embodiment of the present invention, an anamorphic optical system includes both a cross-process optical subsystem and a process-direction optical subsystem. The cross-process optical subsystem is disposed between the input two-dimensional light field and the process-direction optical subsystem, and includes one or more cylindrical/acylindrical lenses that image the two-dimensional modulated light field in the cross-process direction. In alternative specific embodiments the process-direction optical subsystem includes either doublet lens elements or triplet lens elements that are arranged to achieve the desired cross-process imaging. This arrangement facilitates generating a wide scan line that can be combined ("stitched" or blended together with a region of overlap) with adjacent optical systems to produce an assembly having a substantially unlimited length scan line. In another embodiment, a collimating cross-process direction cylindrical/acylindrical field lens is disposed between the cross-process optical subsystem and the source of the two-dimensional light field, and is positioned to enable locating an aperture stop between the doublet or triplet lens elements, thereby enabling efficient correction of aberrations using a low number of simple lenses, and also and minimizes the size of doublet/triplet lens elements. The process optical subsystem is located between the cross-process optical subsystem and the imaging surface (i.e., the optical system output), and includes either a single process-direction optical (e.g., mirror or lens) element or doublet process-direction optical (e.g., mirror or lens) elements that that serve to image and concentrate the light field in the process direction in a manner consistent with that described above.

In an exemplary embodiment, the anamorphic optical system images and concentrates the modulated light portions forming the two-dimensional light field in the process direction such that the concentrated light portions forming the line image on the imaging surface have a light intensity that is at least two times that of the individual light portions forming the light field. Because the relatively low power homogenous light is spread over the large number of modulating elements and only achieves a high intensity at the imaging surface, the present invention can be produced using low-cost, commercially available spatial light modulating devices, such as digital micromirror (DMD) devices, electro-optic diffractive modulator arrays, or arrays of thermo-optic absorber elements. That is, by utilizing a homogenizer to spread the high energy laser light out over an extended two-dimensional area, the intensity (Watts/cc) of the light over a given area (e.g., over the area of each modulating element) is reduced to an acceptable level such that low cost optical glasses and antireflective coatings can be utilized to form spatial light modulator with improved power handling capabilities. Spreading the light uniformly out also eliminates the negatives imaging effects that point defects (e.g., microscopic dust particles or scratches) have on total light transmission losses.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to improvements in imaging systems and related apparatus (e.g., scanners and printers). The following description is presented to enable one of ordinary skill in the art to make and use the invention as provided in the context of a particular application and its requirements. As used herein, directional terms such as "upper", "uppermost", "lower", "vertical" and "horizontal" are intended to provide relative positions for purposes of description, and are not intended to designate an absolute frame of reference. As used herein, reference to the position of optical elements (lenses, mirrors) as being located "between" other optical elements is intended to mean in the sense of the normal light path through the associated optical system unless specified otherwise (e.g., a lens is "between" two mirrors when, during normal operation of an optical system including the lens and mirrors, light is reflected from one mirror through the lens to the other mirror). As used herein, the compound term "cylindrical/acylindrical" is intended to mean that an associated optical element is either cylindrical (i.e., a cylindrical lens or mirror whose curved optical surface or surfaces are sections of a cylinder and focus an image onto a line parallel to the intersection of the optical surface and a plane tangent to it), or acylindrical (i.e., an elongated curved lens or mirror whose curved optical surface or surfaces are not cylindrical, but still focus an image onto a line parallel to the intersection of the optical surface and a plane tangent to it). Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
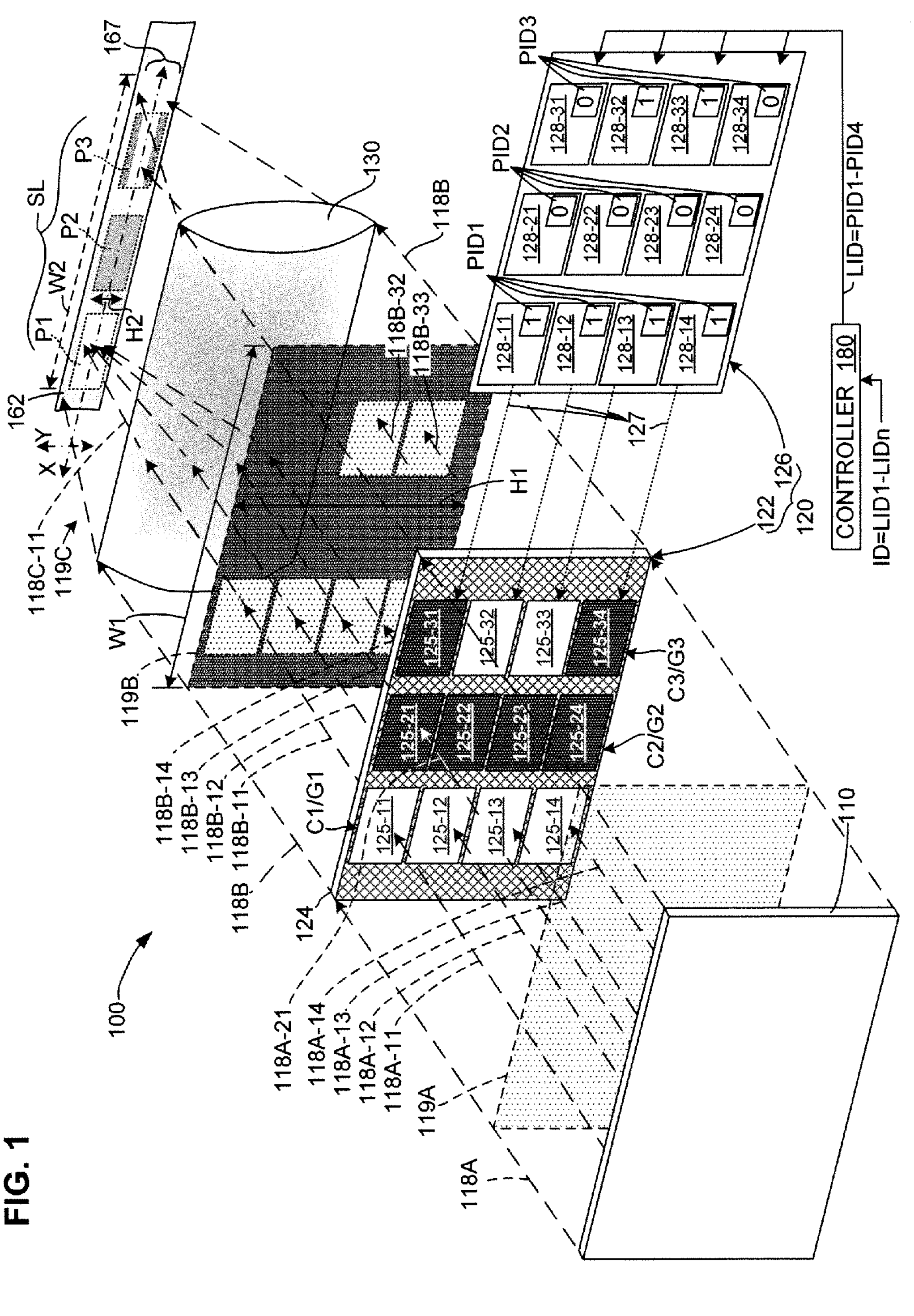
FIG. 1 is a top side perspective view showing a simplified imaging system utilizing an anamorphic optical system in accordance with an exemplary embodiment of the present invention.

FIG. 1 is a perspective view showing a simplified single-pass imaging system 100 utilized to generate a substantially one-dimensional line image of a two-dimensional image on an imaging surface 162 using an anamorphic optical system 130 in accordance with a simplified embodiment of the present invention. Simplified imaging system 100 further includes a homogenous light generator 110, a spatial light modulator 120 that is controlled as described below by a controller 180 to modulate homogeneous light 118A received from homogenous light generator 110, and anamorphic optical system 130 that is positioned to image and concentrate a modulated light field 119B generated by spatial light modulator 120 in the manner described below, and to generate (project) a substantially one-dimensional line image SL on imaging surface 162.

The present invention is described below with reference to exemplary imaging processes involving the conversion of digital image data (referred to herein as "image data file ID") to a corresponding two-dimensional image (e.g., a picture or print document) consisting of a light pattern that is specified by the digital image data. In particular, the invention is described with reference to an "imaging phase" (portion) of the imaging operation involving the generation of a single line (referred to for convenience herein as a "line image") of the two-dimensional image in accordance with associated line data (referred to for convenience herein as a "line image data portion"). As described in additional detail below, exemplary imaging processes involving the conversion of digital image data to a corresponding two-dimensional image consisting of a light pattern that is specified by the digital image data and in particular to the generation of a of the that is stored according to known techniques and. In such imaging image data file ID is depicted at the bottom of FIG. 1 being transmitted to controller 180, which processes image data file ID in the manner described below, and transmits image data file ID one line at a time to spatial light modulator 120. That is, consistent with most standardized image file formats, image data file ID is made up of multiple line image data groups LID1 to LIDn, where each line image data group includes multiple pixel image data portions that collectively form an associated one-dimensional line image of the two-dimensional image. For example, in the simplified example shown in FIG. 1, line image data group LID1 includes four pixel image data portions PID1 to PID3. Each pixel image data portion (e.g., pixel image data portion PID1) includes one or more bits of image data corresponding to the color and/or gray-scale properties of the corresponding pixel image associated with the corresponding portion of the two-dimensional image. Those skilled in the art will recognize that, in practical embodiments, each line image data group typically includes a much larger number of pixel image data portions that the four-, eight-, or twenty-four pixel image rows described herein.

Figure 2:
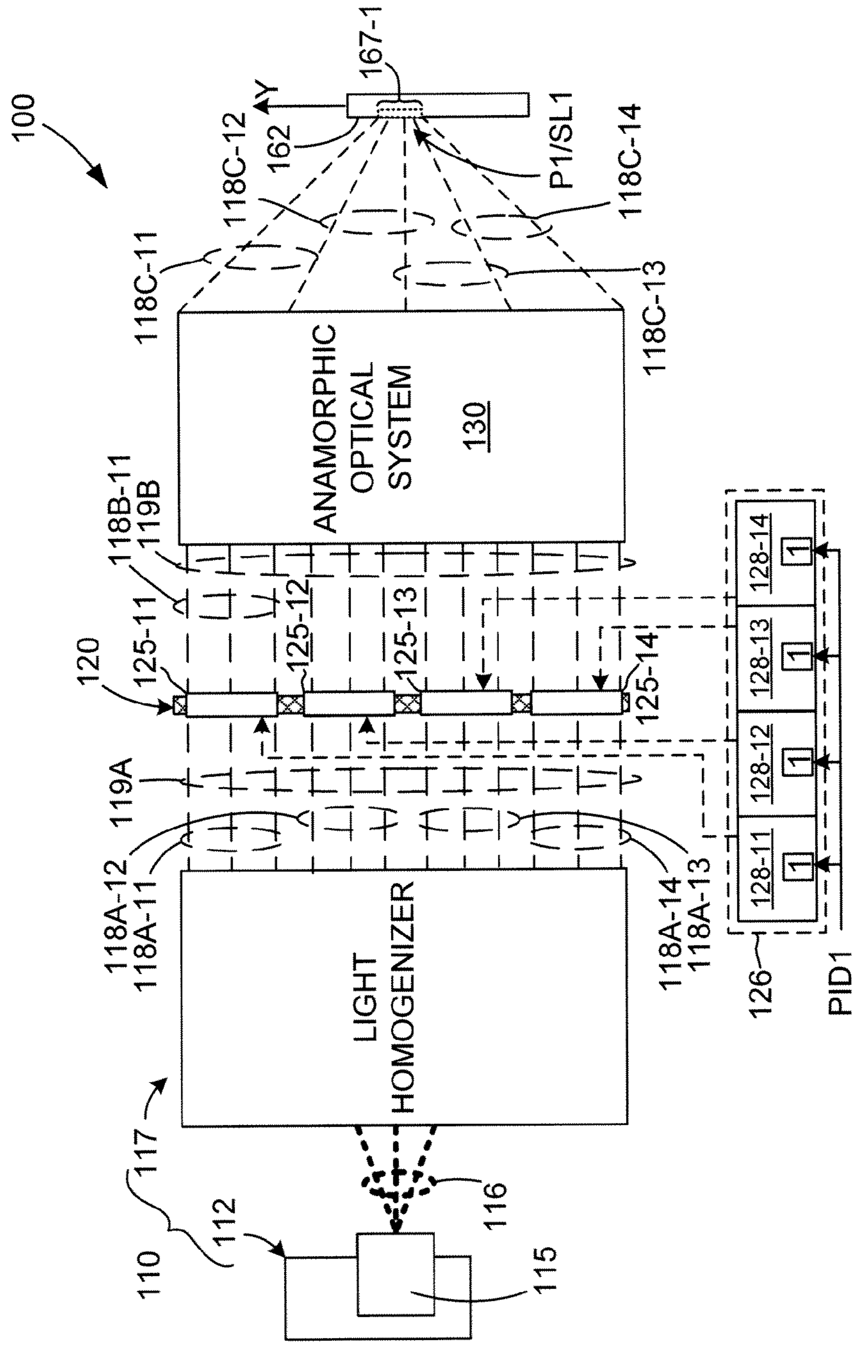
FIG. 2 is a simplified side view showing the imaging system of FIG. 1 during an imaging operation according to an embodiment of the present invention.

Referring to the lower left portion of FIG. 1 and to FIG. 2, homogenous light generator 110 serves to generate continuous (i.e., constant/non-modulated) homogenous light 118A that forms a substantially uniform two-dimensional homogenous light field 119A, which is depicted by the projected dotted rectangular box (i.e., homogenous light field 119A does not form a structure), and is made up of homogenous light 118A having substantially the same constant energy level (i.e., all portions of homogenous light field 119A have substantially the same flux density). In an exemplary specific embodiment shown in FIG. 2, homogeneous light generator 110 comprises a light source 112 including a light generating element (e.g., one or more lasers or light emitting diodes) 115 fabricated or otherwise disposed on a suitable carrier (e.g., a semiconductor substrate) 111, and a light homogenizing optical system (homogenizer) 117 that is disposed between light source 112 and spatial light modulator 120. Homogenizer 117 generates homogenous light 118 by homogenizing (i.e., mixing and spreading out) light beam 116 over an extended two-dimensional area, and reduces any divergences of light beams 116. Those skilled in the art will recognize that this arrangement effectively converts the concentrated, relatively high energy intensity and high divergence of light beam 116 into dispersed, relatively low energy flux homogenous light 118 that is substantially evenly distributed onto all modulating elements (e.g., modulating elements 125-11 to and 125-34) of spatial light modulator 120. In an exemplary embodiments, homogeneous light source 110 is implemented by multiple edge emitting laser diodes arranged along a straight line that is disposed parallel to the rows of light modulating elements (not shown), or multiple vertical cavity surface emitting lasers (VCSELs) are arranged in a two-dimensional array. Ideally such laser sources would have high plug efficiencies (e.g., greater than 50%) so that passive water cooling or forced air flow could be used to easily take away excess heat. Light homogenizer 117 can be implemented using any of several different technologies and methods known in the art including but not limited to the use of a fast axis concentrator (FAC) lens together with microlens arrays for beam reshaping, or additionally a light pipe approach which causes light mixing within a waveguide.

Referring back to the left center left portion of FIG. 1, spatial light modulator 120 is disposed in homogenous light field 119A, and includes a modulating element array 122 and a control circuit 126. Spatial light modulator 120 serves the purpose of modulating portions of homogenous light 118A in accordance with the method described below, whereby spatial light modulator 120 converts homogenous light field 119A into a two-dimensional modulated light field 119B that is projected through anamorphic optical system 130 onto an elongated imaging region 167 of imaging surface 162. In a practical embodiment such a spatial light modulator can be purchased commercially and would typically have two-dimensional (2D) array sizes of 1024×768 (SVGA resolution) or higher resolution with light modulation element (pixel) spacing on the order of 5-20 microns. For purposes of illustration, only a small subset of light modulation elements is depicted in FIG. 1.

Referring to the left-center region of FIG. 1, modulating element array 122 of spatial light modulator 120 includes modulating elements 125-11 to 125-34 that are disposed in four horizontal rows and three vertical columns C1-C3 on a support structure 124. Modulating elements 125-11 to 125-34 are disposed in homogenous light field 119A such that a light modulating structure (e.g., a mirror, a diffractive element, or a thermo-optic absorber element) of each modulating element receives a corresponding portion of homogenous light 118A (e.g., modulating elements 125-11 and 125-12 respectively receive homogenous light portions 118A-11 and 118A-12), and is positioned to selectively pass or redirect the received corresponding modulated light portion along a predetermined direction toward anamorphic optical system 130 (e.g., modulating element 125-11 allows received light portion 118A-11 to pass to anamorphic optical system 130, but modulating element 125-21 blocks/redirects/prevents received light portion 118A-21 from passing to anamorphic optical system 130).

Referring to the lower right region of FIG. 1, control circuit 126 includes an array of control (memory) cells 128-11 to 128-34 that store one line image data portion (e.g., line image data portion LIN1) during each imaging phase of an imaging operation. For example, at a given time, line image data portion LIN1 is transmitted (written) from controller 180 to control circuit 126 using known techniques, and line image data portion LIN1 is used to generate a corresponding line image SL in an elongated imaging region 167 of imaging surface 162. During a subsequent imaging phase (not shown), a second line image data portion is written into control circuit 126 (i.e., line image data portion LIN1 is overwritten), and a corresponding second line image (not shown) is generated in another elongated imaging region of imaging surface 162. Note that this process requires movement (translation) of imaging surface 162 in the process (Y-axis) direction after line image SL is generated and before the second line image is generated. Those skilled in the art will recognize that, by repeating such imaging phases for each scan image data portion LIN1-LINn of image data file ID, the associated two-dimensional image is generated on imaging surface 162.

In the exemplary embodiment shown in FIG. 1, each memory cell 128-11 to 128-34 of control circuit 126 stores a single data bit (1 or 0), and each light modulating element 125-11 to 125-34 is respectively individually controllable by way of the data bit stored in an associated memory cell 128-11 to 128-34 (e.g., by way of control signals 127) to switch between an "on" (first) modulated state and an "off" (second) modulated state. When the associated memory cell of a given modulating element stores a logic "1" value, the given modulating element is controlled to enter an "on" modulated state, whereby the modulating element is actuated to direct the given modulating element's associated received light portion toward anamorphic optic 130. For example, in the simplified example, modulating element 125-11 is turned "on" (e.g., rendered transparent) in response to the logic "1" stored in memory cell 128-11, whereby received light portion 118A-11 is passed through spatial light modulator 120 and is directed toward anamorphic optic 130. Conversely, modulating element 125-21 is turned "off" (e.g., rendered opaque) in response to the logic "0" stored in memory cell 128-21, whereby received light portion 118A-21 is blocked (prevented from passing to anamorphic optic 130). By selectively turning "on" or "off" modulating elements 125-11 to 125-34 in accordance with image data ID in the manner described herein, spatial light modulator 120 serves to modulate (i.e., pass or not pass) portions of continuous homogenous light 118A such that the modulated light is directed onto anamorphic optical system 130. As set forth in additional detail below, spatial light modulator 120 is implemented using any of several technologies, and is therefore not limited to the linear "pass through" arrangement depicted in FIG. 1.

As used herein, the portions of homogenous light 118A (e.g., homogenous light portion 118A-24) that are passed through or otherwise directed from spatial light modulator 120 toward anamorphic optic 130 are individually referred to as modulated light portions, and collectively referred to as modulated light 118B or two-dimensional modulated light field 119B. For example, after passing through light modulating element 125-11, which is turned "on", homogenous light portion 118A-21 becomes modulated light portion 118B-11, which is passed to anamorphic optic system 130 along with light portions passed through light modulating elements 125-12, 125-13, 125-14, 125-32 and 125-33, as indicated by the light colored areas of the diagram depicting modulated light field 119B. Conversely, when a given modulating element (e.g., modulating element 125-21) is in the "off" modulated state, the modulating element is actuated to prevent (e.g., block or redirect) the given modulating element's associated received light portion, whereby the corresponding region of the diagram depicting modulated light field 119B is dark.

Referring to the center right portion of FIG. 1, anamorphic optical system 130 serves to anamorphically image and concentrate (focus) two-dimensional modulated light field 119B onto elongated imaging region 167 of imaging surface 162. In particular, anamorphic optical system 130 includes one or more optical elements (e.g., lenses and/or mirrors) that are positioned to receive the two-dimensional pattern of modulated light field 119B, where the one or more optical elements (e.g., lenses or mirrors) are arranged to concentrate the received light portions to a greater degree along the process (e.g., Y-axis) direction than along the cross-process (X-axis) direction, whereby the received modulated light portions are anamorphically focused to form elongated line image SL that extends parallel to the cross-process (X-axis) direction. In one embodiment, anamorphic optical system 130 images the modulated light such that a width W2 of line image SL in the cross-process (X-axis) direction is equal to or greater than an original width W1 of modulated light field 119B, and such that a height H2 of line image SL in the process (Y-axis) direction is substantially (e.g., three or more times) smaller than an original height H1 of two-dimensional modulated light field 119B. Note that modulated light portions that have passed through anamorphic optical system 130 but have not yet reached imaging surface 162 are referred to as concentrated modulated light portions (e.g., modulated light portion 118B-11 becomes concentrated modulated light portion 118C-11 between anamorphic optical system 130 and imaging surface 162). Anamorphic optical system 130 is represented for the purposes of simplification in FIG. 1 by a single generalized anamorphic projection lens. In practice anamorphic system 130 is typically composed of multiple separate cylindrical or acylindrical lenses, such as described below with reference to various specific embodiments, but is not limited to the specific optical systems described herein.

Figure 3:
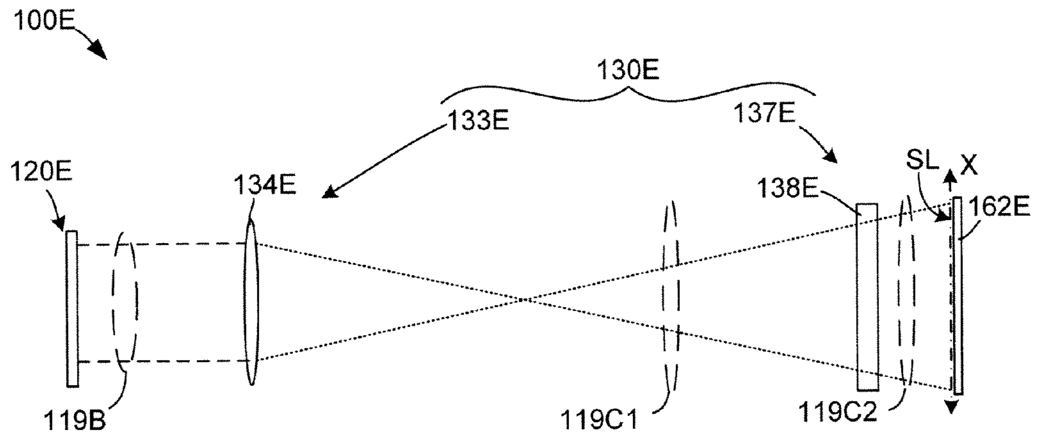
FIG. 3 is a simplified top view showing a multi-lens anamorphic optical system utilized by imaging system of FIG. 1 according to a specific embodiment of the present invention.
Figure 4:
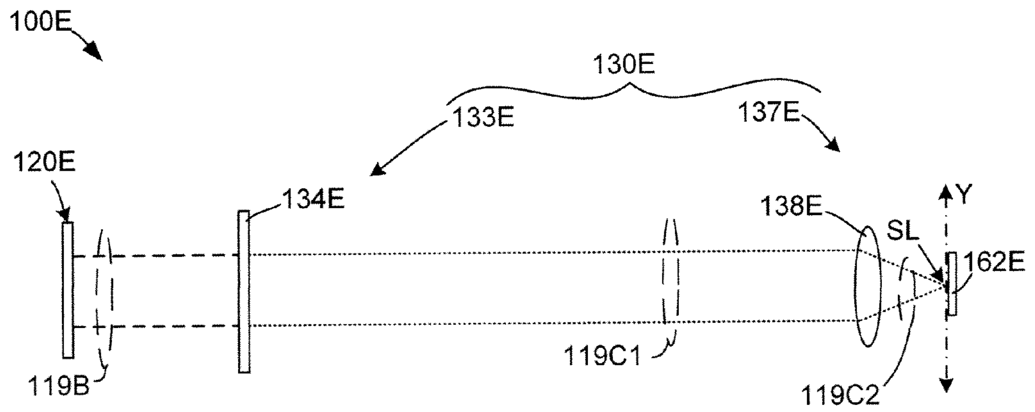
FIG. 4 is a simplified top side view showing the multi-lens anamorphic optical system of FIG. 3.

FIGS. 3 and 4 are top view and side view diagrams showing a portion of an imaging system 100E including a spatial light modulator 120E and a simplified anamorphic optical system 130E according to a generalized specific embodiment of the present invention. Anamorphic optical system 130E includes a cross-process optical subsystem 133E and a process-direction optical subsystem 137E that is disposed in the optical path between cross-process optical subsystem 133E and imaging surface 162E. Cross-process optical subsystem 133E is positioned to receive modulated light field 119B from spatial light modulator 120E, and includes a cylindrical/acylindrical lens 134E shaped and arranged to image modulated light field 119B in the cross-process X-axis direction. The processed light passed from cross-process optical subsystem 133E to process-direction optical subsystem 137E is referred to herein as imaged light 119C1. Process-direction includes optical subsystem 137E includes a cylindrical/acylindrical focusing lens 138 that is shaped and arranged to image and concentrate the imaged light 119C1 passed from cross-process optical subsystem 133E in the process (Y-axis) direction in order to generate substantially one-dimensional line image SL on imaging surface 162E. The imaged and concentrated (converging) light passed from process-direction optical subsystem 137E to imaging surface 162E is referred to herein as imaged and concentrated light 119C2.

FIGS. 3 and 4 include dashed-line ray traces indicating the function of optical subsystems 133E and 137E are disposed in the optical path between spatial light modulator 120E and imaging surface 162E. The top view of FIG. 3 shows that cross-process optical subsystem 133E acts to expand modulated light field 119B in the X-axis (i.e., in the cross-process direction), and the side view of FIG. 4 shows that process-direction optical subsystem 137E acts on modulated light portions 118B passed by spatial light modulator 120E to generate imaged and concentrated light field 119C2 in a direction perpendicular to the Y-axis (i.e., in the process direction) to form line image SL on imaging surface 162E. The advantage of this arrangement is that it allows the intensity of the light (e.g., laser) power to be concentrated on scan line SL located at the output of single-pass imaging system 100E. As the focusing power of cylindrical/acylindrical lens element 138E is increased, the intensity of the light on spatial light modulator 120E is reduced relative to the intensity of the line image generated at line image SL. However, this means that cylindrical or acylindrical lens 138E must be placed closer to imaging surface 162E (e.g., the surface of an imaging drum cylinder) with a clear aperture extending to the very edges of lens 138E.

Referring again to FIG. 1, by utilizing anamorphic optical system 130 to concentrate modulated light field 119B in the process (Y-axis) direction, a "single-pass" substantially one-dimensional line image SL is formed on imaging surface 162 that extends in the cross-process (X-axis) direction. When a given pixel image (e.g., portion P1) is generated by activating all modulating elements (e.g., 125-11 to 125-14) of a given group (e.g., group G1), high total optical intensity (flux density, e.g., on the order of hundreds of Watts/cm$^2$) is generated on a given point of line image SL, thereby facilitating a reliable, high speed imaging system that can be used, for example, to simultaneously produce all portions of a one-dimensional line image SL in a single-pass high resolution high speed printing application.

In accordance with an aspect of the present invention, multi-level image exposure at lower optical resolution is utilized to achieve high quality imaging (e.g., in a printer) by varying the exposure level (i.e., the amount of concentrated light) directed onto each pixel image location of line image SL. In particular, the exposure level for each pixel image (e.g., portions P1, P2 and P3 in FIG. 1) in line image SL is varied by controlling the number and location of the activated light modulating elements of spatial light modulator 120, thereby controlling the amount and location of modulated light 118B that is combined to generate each pixel image. This approach provides a significant improvement over conventional laser ROS operations in that, instead of modulating a high power laser while scanning the laser beam using high optical resolution across an imaging surface to provide multi-level (gray-scale) image exposure properties, the present invention simultaneously provides multi-level image exposure at all locations of line image SL by modulating a relatively low power light source and by utilizing a relatively low optical resolution imaging system to focus the modulated light onto imaging surface 162. That is, by utilizing a homogeneous light that is spread out over an extended two-dimensional area, the intensity (Watts/cm$^2$) of the light over a given area (e.g., over the area of each modulating element 125-11 to 125-34) is reduced to an acceptable level such that low cost optical glasses and antireflective coatings can be utilized to form spatial light modulator 120, thus reducing manufacturing costs. Uniformly spreading the light also eliminates the negative imaging effects that point defects (e.g., microscopic dust particles or scratches) have on total light transmission losses.

Multi-level image exposure is achieved by imaging system 100 by forming groups of light modulating elements that are substantially aligned in the process (Y-axis) direction defined by the anamorphic optical system, configuring each modulating element group in accordance with an associated pixel image data portion of the line image data group written into the spatial light modulator, and then utilizing anamorphic optical system 130 to image and concentrate the resulting elongated pixel image in the process direction to form a high-intensity pixel image portion of image line SL. For example, in the exemplary embodiment shown in FIG. 1, spatial light modulator 120 is arranged relative to anamorphic optical system 130 such that modulating element columns C1 to C3 are aligned parallel to the process (Y-axis) direction defined by anamorphic optical system 130. In this arrangement, each modulating element group consists of the modulating elements disposed in each of the columns C1 to C3, where group G1 includes all modulating elements (i.e., elements 125-11 to 125-14) of column C1, group G2 includes modulating elements 125-21 to 125-24) of column C2, and group G3 includes modulating elements 125-31 to 125-34) of column C3. The images generated by each group/column effectively form pixel images that are "stretched" (elongated) in the process (Y-axis) direction (e.g., light elements 118B-11 to 118B-14 form a first elongated "bright" pixel image associated with pixel data PID11). Because anamorphic optical system 130 generates each pixel image (e.g., pixel image P1) of line image SL by concentrating modulated light portions in the process direction, the gray-scale properties of each pixel image P1 can be controlled by configuring a corresponding number of modulating elements (e.g., elements 125-11 to 125-14) that are aligned in the process (Y-axis) direction. By utilizing controller 180 to interpret the gray-scale value of each pixel image data portion (e.g., pixel image data portion PID1) and to write corresponding control data into control cells (e.g., cells 128-11 to 128-14) of the modulating element group (e.g., group G1) associated with that pixel image data portion, the appropriate pixel image is generated at each pixel location of line image SL.

FIG. 1 shows multi-level image exposure using three exposure levels: "fully on", "fully off" and "partially on". In the simplified example shown in FIGS. 1 and 2, pixel image data portion PID1 has a "fully on" (first) gray-scale value, whereby controller 180 writes pixel image data portion PID1 to control circuit 126 of spatial light modulator 120 such that all modulating elements 125-11 to 125-14 of associated modulating element group G1 are activated (i.e., configured into the "on" (first) modulated state). Because modulating elements 125-11 to 125-14 are activated, homogeneous light portions 118A-11 to 118A-14 of homogeneous light field 119A are passed through modulating elements 125-11 to 125-14 such that modulated light portions 118B-11 to 118B-14 of modulated light field 119B are directed onto the anamorphic optical system 130. Similarly, pixel image data portion PID2 has a "fully off" (second) value, so all of modulating elements 125-21 to 125-24 of associated modulating element group G2 are deactivated (i.e., configured into an "off" (second) modulated state) such that homogeneous light 118A (e.g., homogeneous light portion 118A-21) that is directed onto modulating elements 125-21 to 125-24 are prevented (i.e., blocked or redirected) from reaching anamorphic optical system 130, thereby generating light pixel image P2 as a minimum (dark) image "spot" in a second imaging region portion 167-2 on imaging surface 162. Finally, the gray-scale value of pixel image data portion PID3 is "partially on", which is achieved by configuring light modulating elements 125-31 to 125-34 such that modulating elements 125-32 and 125-33 are activated and modulating elements 125-31 and 125-34 are deactivated, causing homogeneous light portions to pass only through modulating elements 125-32 to 125-33 to anamorphic optical system 130, whereby pixel image P3 is formed in third imaging region portion 167-3 of imaging surface 162 as a small bright "spot".

Those skilled in the art will understand that the production of a two-dimensional image using the system and method described above requires periodic or continuous movement (i.e., scrolling) of imaging surface 162 in the process (Y-axis) direction and reconfiguring spatial light modulator 120 after each imaging phase. For example, after generating line image SL using line image data group LIN1 as shown in FIG. 1, imaging surface 162 is moved upward and a second imaging phase is performed by writing a next sequential line image data group into spatial light modulator 120, whereby a second line image is generated as described above that is parallel to and positioned below line image SL. Note that light source 110 is optionally toggled between imaging phases, or maintained in an "on" state continuously throughout all imaging phases of the imaging operation. By repeating this process for all line image data groups LIN1-LINn of image data file ID, the two-dimensional image represented by image data file ID is generated on imaging surface 162.

According to alternative embodiments of the present invention, the spatial light modulator is implemented using commercially available devices including a digital micromirror device (DMD), such as a digital light processing (DLP®) chip available from Texas Instruments of Dallas Tex., USA, an electro-optic diffractive modulator array such as the Linear Array Liquid Crystal Modulator available from Boulder Nonlinear Systems of Lafayette, Colo., USA, or an array of thermo-optic absorber elements such as Vanadium dioxide reflective or absorbing mirror elements. Other spatial light modulator technologies may also be used. While any of a variety of spatial light modulators may be suitable for a particular application, many print/scanning applications today require a resolution 1200 dpi and above, with high image contrast ratios over 10:1, small pixel size, and high speed line addressing over 30 kHz. Based on these specifications, the currently preferred spatial light modulator is the DLP™ chip due to its best overall performance.

Figure 5:
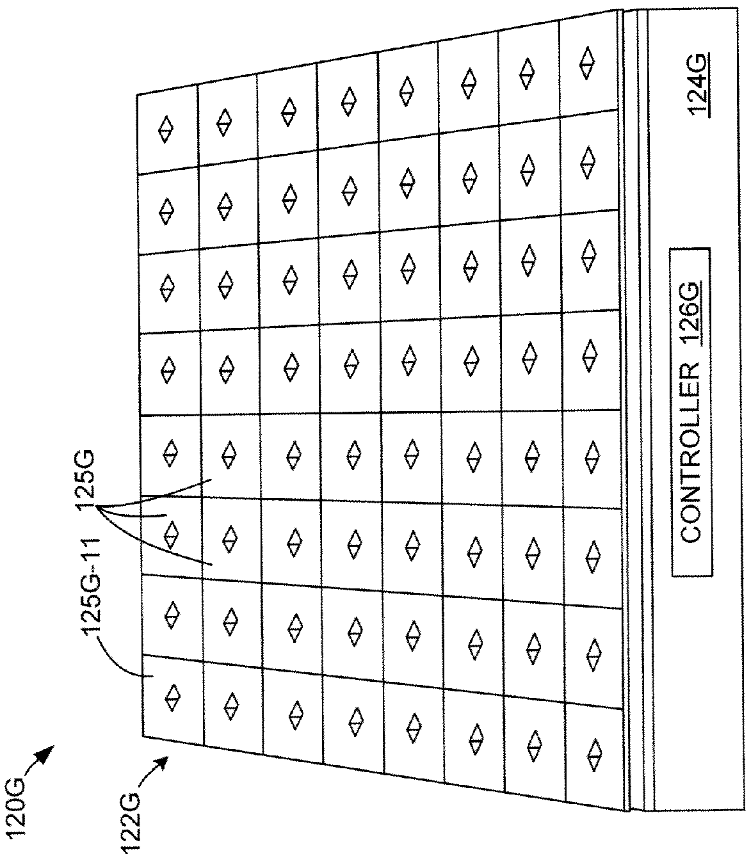
FIG. 5 (PRIOR ART)
FIG. 5 is a perspective view showing a portion of a DMD-type spatial light modulator utilized by imaging system of FIG. 1 according to a specific embodiment of the present invention.

FIG. 5 is a perspective view showing a portion of a DMD-type spatial light modulator 120G including a modulating element array 122G made up of multiple microelectromechanical (MEMs) mirror mechanisms 125G. DMD-type spatial light modulator 120G is utilized in accordance with a specific embodiment of the present invention. Modulating element array 122G is consistent with DMDs sold by Texas Instruments, wherein MEMs mirror mechanisms 125G are arranged in a rectangular array on a semiconductor substrate (i.e., "chip" or support structure) 124G. Mirror mechanism 125G are controlled as described below by a control circuit 126G that also is fabricated on substrate 124G according to known semiconductor processing techniques, and is disposed below mirrors 125G. Although only sixty-four mirror mechanisms 125G are shown in FIG. 5 for illustrative purposes, those skilled in the art will understand that any number of mirror mechanisms are disposed on DMD-type modulating element array 122G, and that DMDs sold by Texas Instruments typically include several hundred thousand mirrors per device.

Figure 6:
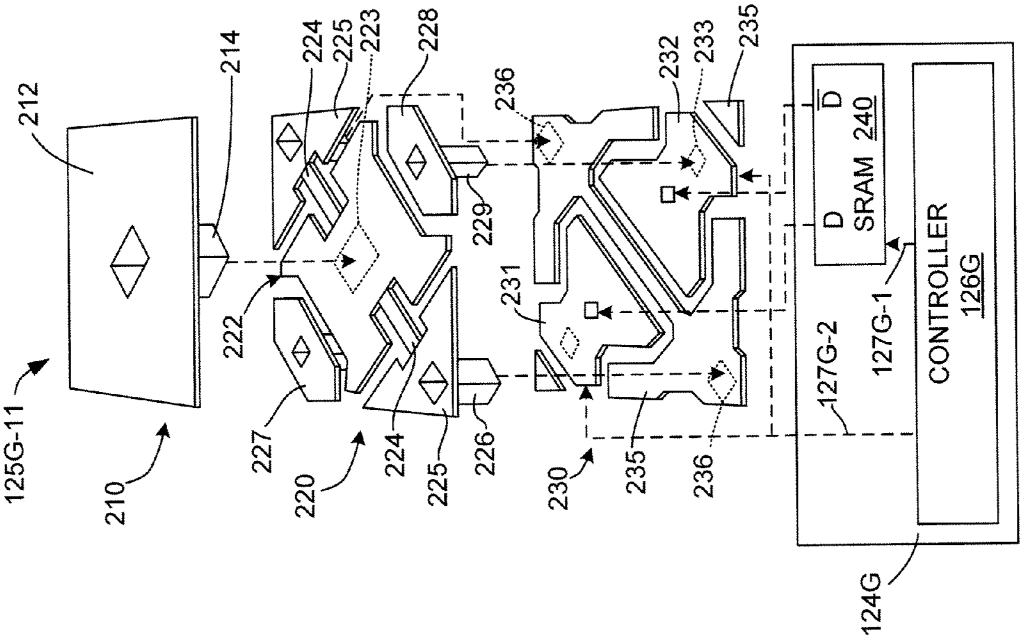
FIG. 6 (PRIOR ART)
FIG. 6 is an exploded perspective view showing a light modulating element of the DMD-type spatial light modulator of FIG. 5 in additional detail.

FIG. 6 is a combination exploded perspective view and simplified block diagram showing an exemplary mirror mechanism 125G-11 of DMD-type modulating element array 122G (see FIG. 5) in additional detail. For descriptive purposes, mirror mechanism 125G-11 is segmented into an uppermost layer 210, a central region 220, and a lower region 230, all of which being disposed on a passivation layer (not shown) formed on an upper surface of substrate 124G. Uppermost layer 210 of mirror mechanism 125G-11 includes a square or rectangular mirror (light modulating structure) 212 that is made out of aluminum and is typically approximately 16 micrometers across. Central region 220 includes a yoke 222 that connected by two compliant torsion hinges 224 to support plates 225, and a pair of raised electrodes 227 and 228. Lower region 230 includes first and second electrode plates 231 and 232, and a bias plate 235. In addition, mirror mechanism 125G-11 is controlled by an associated SRAM memory cell 240 (i.e., a bi-stable flip-flop) that is disposed on substrate 124G and controlled to store either of two data states by way of control signal 127G-1, which is generated by control circuit 126G in accordance with image data as described in additional detail below. Memory cell 240 generates complementary output signals D and D-bar that are generated from the current stored state according to known techniques.

Lower region 230 is formed by etching a plating layer or otherwise forming metal pads on a passivation layer (not shown) formed on an upper surface of substrate 124G over memory cell 240. Note that electrode plates 231 and 232 are respectively connected to receive either a bias control signal 127G-2 (which is selectively transmitted from control circuit 126G in accordance with the operating scheme set forth below) or complementary data signals D and D-bar stored by memory cell 240 by way of metal vias or other conductive structures that extend through the passivation layer.

Central region 220 is disposed over lower region 230 using MEMS technology, where yoke 222 is movably (pivotably) connected and supported by support plates 225 by way of compliant torsion hinges 224, which twist as described below to facilitate tilting of yoke 222 relative to substrate 124G. Support plates 225 are disposed above and electrically connected to bias plate 235 by way of support posts 226 (one shown) that are fixedly connected onto regions 236 of bias plate 235. Electrode plates 227 and 228 are similarly disposed above and electrically connected to electrode plates 231 and 232, respectively, by way of support posts 229 (one shown) that are fixedly connected onto regions 233 of electrode plates 231 and 232. Finally, mirror 212 is fixedly connected to yoke 222 by a mirror post 214 that is attached onto a central region 223 of yoke 222.

Figure 7A:
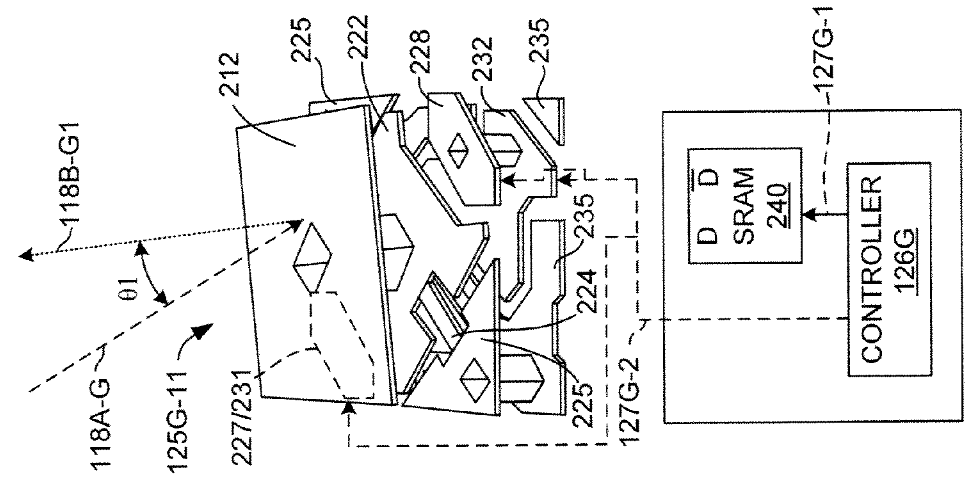
FIGS. 7(A), 7(B) and 7(C) are perspective views showing the light modulating element of FIG. 6 during operation.
Figure 7B:
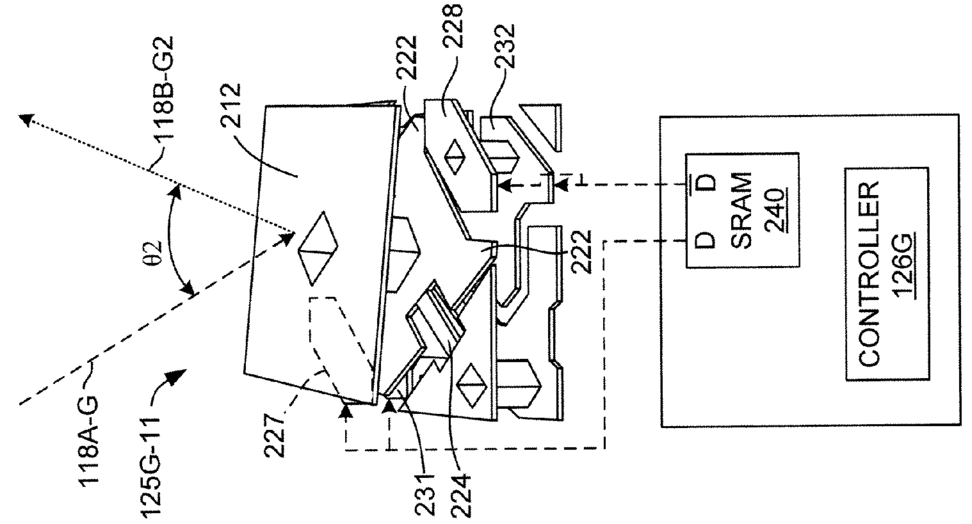
Figure 7C:
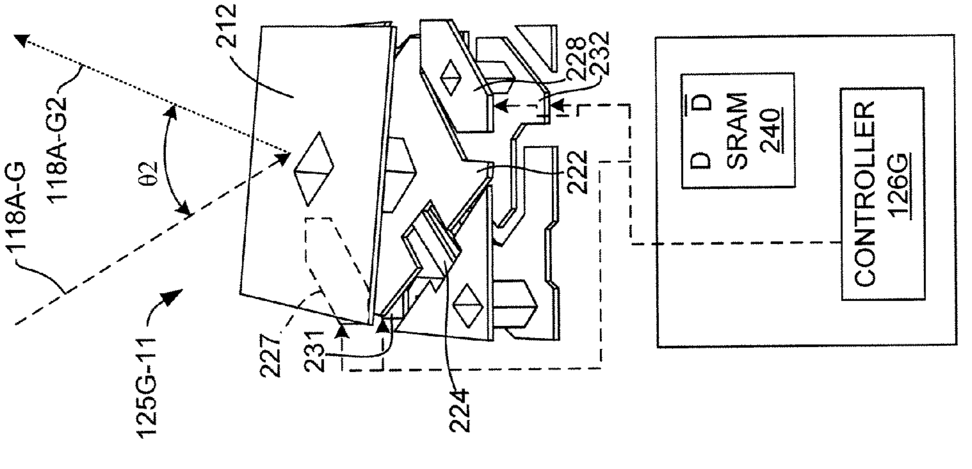

FIGS. 7(A) to 7(C) are perspective/block views showing mirror mechanism 125G-11 of FIG. 5 during operation. FIG. 7(A) shows mirror mechanism 125G-11 in a first (e.g., "on") modulating state in which received light portion 118A-G becomes reflected (modulated) light portion 118B-G1 that leaves mirror 212 at a first angle θ1. To set the "on" modulating state, SRAM memory cell 240 stores a previously written data value such that output signal D includes a high voltage (VDD) that is transmitted to electrode plate 231 and raised electrode 227, and output signal D-bar includes a low voltage (ground) that is transmitted to electrode plate 232 and raised electrode 228. These electrodes control the position of the mirror by electrostatic attraction. The electrode pair formed by electrode plates 231 and 232 is positioned to act on yoke 222, and the electrode pair formed by raised electrodes 227 and 228 is positioned to act on mirror 212. The majority of the time, equal bias charges are applied to both sides of yoke 222 simultaneously (e.g., as indicated in FIG. 7(A), bias control signal 127G-2 is applied to both electrode plates 227 and 228 and raised electrodes 231 and 232). Instead of flipping to a central position, as one might expect, this equal bias actually holds mirror 122 in its current "on" position because the attraction force between mirror 122 and raised electrode 231/electrode plate 227 is greater (i.e., because that side is closer to the electrodes) than the attraction force between mirror 122 and raised electrode 232/electrode plate 228.

To move mirror 212 from the "on" position to the "off" position, the required image data bit is loaded into SRAM memory cell 240 by way of control signal 127G-1 (see the lower portion of FIG. 7(A). As indicated in FIG. 7(A), once all the SRAM cells of array 122G have been loaded with image data, the bias control signal is de-asserted, thereby transmitting the D signal from SRAM cell 240 to electrode plate 231 and raised electrode 227, and the D-bar from SRAM cell 240 to electrode plate 232 and raised electrode 228, thereby causing mirror 212 to move into the "off" position shown in FIG. 7(B), whereby received light portion 118A-G becomes reflected light portion 118B-G2 that leaves mirror 212 at a second angle θ2. In one embodiment, the flat upper surface of mirror 212 tilts (angularly moves) in the range of approximately 10 to 12° between the "on" state illustrated in FIG. 7(A) and the "off" state illustrated in FIG. 7(B). When bias control signal 127G-2 is subsequently restored, as indicated in FIG. 7(C), mirror 212 is maintained in the "off" position, and the next required movement can be loaded into memory cell 240. This bias system is used because it reduces the voltage levels required to address the mirrors such that they can be driven directly from the SRAM cells, and also because the bias voltage can be removed at the same time for the whole chip, so every mirror moves at the same instant.

As indicated in FIGS. 7(A) to 7(C), the rotation torsional axis of mirror mechanism 125G-11 causes mirrors 212 to rotate about a diagonal axis relative to the x-y coordinates of the DLP chip housing. This diagonal tilting requires that the incident light portions received from the spatial light modulator in an imaging system be projected onto each mirror mechanism 125G at a compound incident angle so that the exit angle of the light is perpendicular to the surface of the DLP chip. This requirement complicates the side by side placement of imaging systems.

Figure 8:
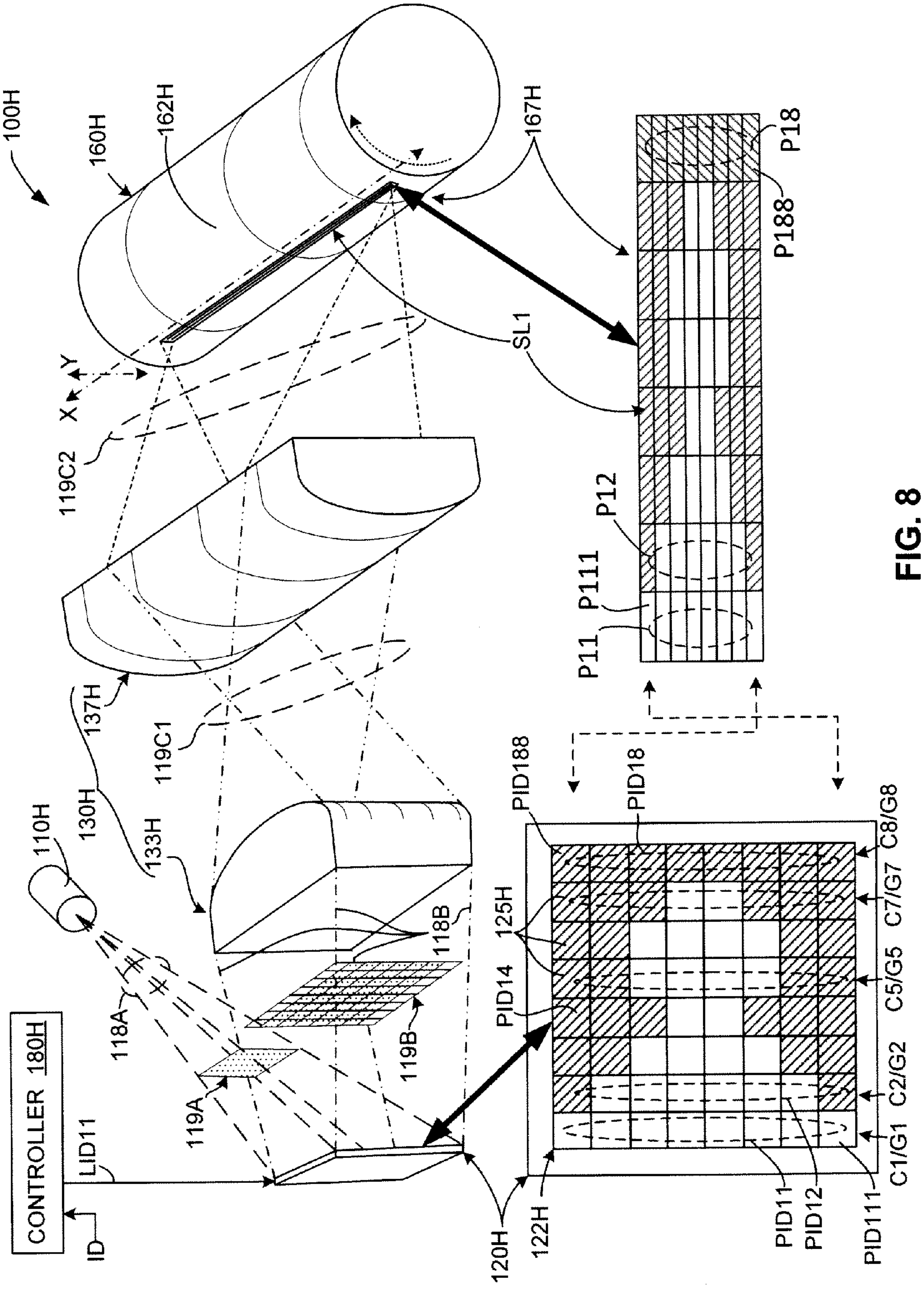
FIG. 8 is a perspective view showing an imaging system utilizing a DMD-type spatial light modulator and an all-refractive optical system in a folded arrangement according to another specific embodiment of the present invention.

FIG. 8 is a perspective view showing an imaging system 100H utilizing a DMD-type spatial light modulator 120H including a simplified associated anamorphic optical system 130H that are positioned in a "folded" arrangement according to a specific embodiment of the present invention. Spatial light modulator 120H is essentially identical to DMD-type spatial light modulator 120G (described above), and is positioned at a compound angle relative to homogenous light generator 110H and anamorphic optical system 130H such that incident homogenous light portion 118A of homogenous light field 119A are either reflected toward anamorphic optical system 130H when associated MEMs mirror mechanisms 125H of spatial light modulator 120H are in the "on" position, or reflected away from anamorphic optical system 130H (e.g., onto a heat sink, not shown) when associated MEMs mirror mechanisms 125H of spatial light modulator 120H are in the "off" position. That is, each light portions 118A of homogenous light field 119A that is directed onto an associated MEMs mirror mechanism 125H of spatial light modulator 120H from homogenous light generator 110H is reflected from the associated MEMs mirror mechanism 125H to anamorphic optical system 130 only when the associated MEMs mirror mechanism 125H is in the "on" position (e.g., as described above with reference to FIG. 7(A)). Conversely, each MEMs mirror mechanism 125H that is in the "off" position reflects an associated light portion 118B at angle that directs the associated light portion 118B away from anamorphic optical system 130H. In one embodiment, the components of imaging system 100H are maintained in the "folded" arrangement by way of a rigid frame that is described in detail in co-owned and co-pending application Ser. No. 13/216,817, entitled SINGLE-PASS IMAGING SYSTEM USING SPA- TIAL LIGHT MODULATOR AND ANAMORPHIC PROJECTION OPTICS, which is incorporated herein by reference in its entirety.

DMD-type imaging system 100H is characterized in that anamorphic optical system 130H inverts modulated light field 119B in both the process and cross-process directions such that the position and left-to-right order of the two line images generated on drum cylinder 160H are effectively "flipped" in both the process and cross-process directions. The diagram at the lower left portion of FIG. 8 shows a front view of DMD-type spatial light modulator 120H, and the diagram at the lower right portion of FIG. 8 shows a front view of elongated imaging region 167H of imaging surface 162H. Similar to the embodiment described above with reference to FIG. 1, the lower left diagram shows that modulating element column C1 forms a first modulating element group G1 that is controlled by a first pixel image data portion PID11 of line image data portions LIN11. Similarly, the remaining light modulating element columns form corresponding modulating element groups that implement the remaining pixel image data portions of line image data portions LIN11 (e.g., column C4 forms group G4 that implements pixel image data portion PID14, and column C8 forms group G8 that implements pixel image data portion PID18. Note that modulating element groups G1-G8 are written into spatial light modulator 120H in an "upside-down and backward" manner such that pixel image data bit PID111 of pixel image data portion PID11 is written an inverted (upside-down) manner into a lowermost modulating element of modulating element group G1 (i.e., the lower left portion of array 122H when viewed from the front), and pixel image data bit PID188 of pixel image data portion PID18 is written in an inverted (upside-down) manner in the upper portion of modulating element group G8 (i.e., the upper right portion of array 122H when viewed from the front). As indicated by the double-dot-dash lines in FIG. 8, cross-process optical subsystem 133H inverts modulated light field 119A such that the light modulating elements configured by pixel image data PID11 generate pixel image P11 on the right side of elongated imaging region 167H, and the light modulating elements configured by pixel image data PID18 generate pixel image P18 on the upper left side of elongated imaging region 167H. In addition, process optical subsystem 137H inverts modulated light field 119A such that (non-inverted) pixel image portion (which is generated by the modulating element implementing pixel image data bit PID111) appears in the upper-left portion of elongated imaging region 167H, and such that (non-inverted) pixel image P188 (which is generated by the modulating element implementing pixel image data bit PID188) appears in the lower-right portion of elongated imaging region 167H.

Multi-level image exposure is achieved using imaging system 100H by configuring groups of MEMS mirror mechanisms of DMD-type spatial light modulator 120H that are substantially aligned in the process (Y-axis) direction such that "partially on" pixel images are implemented by activating contiguous MEMS mirror mechanisms that are disposed in the central region of the associated MEMS mirror mechanism group. For example, in the exemplary embodiment shown in FIG. 8, modulating element group G1 consists of the modulating elements 125H disposed in column C1, where group G1 is configured in accordance with a first image pixel data portion PID11 such that all of the modulating elements are disposed an "on" modulated state (indicated by the white filling each element), whereby a pixel image P11 is generated on imaging surface 162H having a maximum brightness. Similarly, modulating element group G8 consists of the modulating elements 125H disposed in column C8, where group G8 is configured in accordance with an image pixel data portion PID18 such that all of the modulating elements are disposed an "off" modulated state (indicated by the slanted-line filling each element), whereby a dark pixel image P18 is generated on imaging surface 162H. The remaining groups (columns) of MEMS mirror mechanisms are configured using three exemplary "partially on" gray-scale values. For example, group G2 is configured by pixel image data portion PID12 having a "mostly on" gray-scale value such that two deactivated MEMS mirror mechanisms disposed at the top and bottom of column C2, and six activated MEMS mirror mechanisms disposed between the deactivated MEMS mirror mechanisms. In contrasts, group G7 is configured by a pixel image data portion having a "barely on" gray-scale value including six deactivated MEMS mirror mechanisms disposed at the top and bottom of column C7 and two activated MEMS mirror mechanisms disposed between the deactivated MEMS mirror mechanisms, and group G5 is configured by a pixel image data portion having a "medium on" gray-scale value including four deactivated MEMS mirror mechanisms disposed at the top and bottom of column C5 and four activated MEMS mirror mechanisms disposed between the deactivated MEMS mirror mechanisms.

FIGS. 9, 10(A), 10(B) and 10(C) are simplified side views showing the imaging system 100H of FIG. 8 during an exemplary imaging operation. Note that the simplified side views ignore inversion in the cross-process direction, and as such anamorphic optical system 130H is depicted by a single lens.

Figure 9:
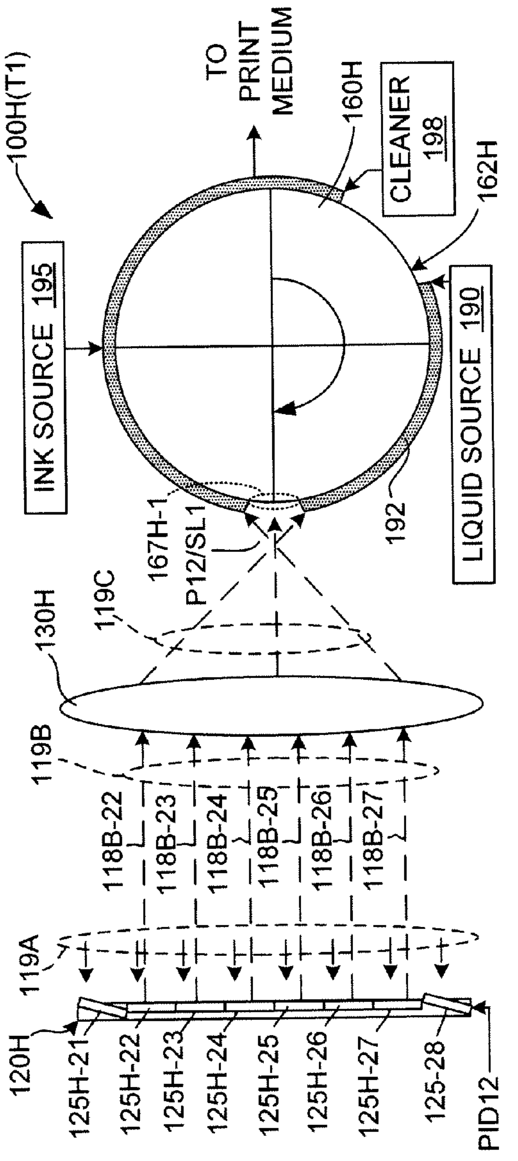
FIG. 9 is a simplified side view showing the imaging system of FIG. 8 during an imaging operation.

FIG. 9 illustrates imaging system 100H(T1) (i.e., imaging system 100H during a first time period T1 of the imaging operation) when exemplary modulating element group G2 of spatial light modulator 120H is respectively configured in accordance with line image data group PID12 in the manner described above with reference to FIG. 8. In particular, FIG. 9 depicts the configuration of modulating elements 125H-21 to 125H-28 using pixel image data portion PID12 such that MEMS mirror mechanisms 125H-22 to 125H-27 are activated and MEMS mirror mechanisms 125H-21 and 125H-28 are deactivated.

Referring to the right side of FIG. 9, to implement an image transfer operation, imaging system 100H further includes a liquid source 190 that applies a fountain solution 192 onto imaging surface 162H at a point upstream of the imaging region, an ink source 195 that applies an ink material 197 at a point downstream of imaging region. In addition, a transfer mechanism (not shown) is provided for transferring the ink material 197 to a target print medium, and a cleaning mechanism 198 is provided for preparing imaging surface 162H for the next exposure cycle. The image transfer operation is further described below with reference to FIGS. 10(A) to 10(C).

Referring again to FIG. 9, because of their activated configuration state, MEMs mirror mechanisms (light modulating elements) 125H-22 to 125H-27 reflect portions of homogenous light field 119A such that modulated light portions 118B-21 to 118B-27 are directed through anamorphic optical system 130H (note that homogeneous light portions are redirected away from anamorphic optical system 130H by deactivated MEMs mirror mechanisms 125H-21 and 125H-28). Modulated light portions 118B-21 to 118B-27 form modulated light field 119B that is imaged and concentrated by anamorphic optical system 130H, thereby generating imaged and concentrated modulated light field 119C2 that produces pixel image P12, which forms part of a line image SL1 in an elongated imaging region 167H-1 on imaging surface 162H. In particular, the concentrated light associated formed by modulated light portions 118B-21 to 118B-27 removes (evaporates) fountain solution 192 from the elongated imaging region 167H-1 (i.e., such that a portion of imaging surface 162H at pixel image P21 is exposed). Note that the size of pixel image P21 (i.e., the amount of fountain solution that is removed from imaging surface 162H) is determined by number of activated MEMs mirror mechanisms.

Figure 10A:
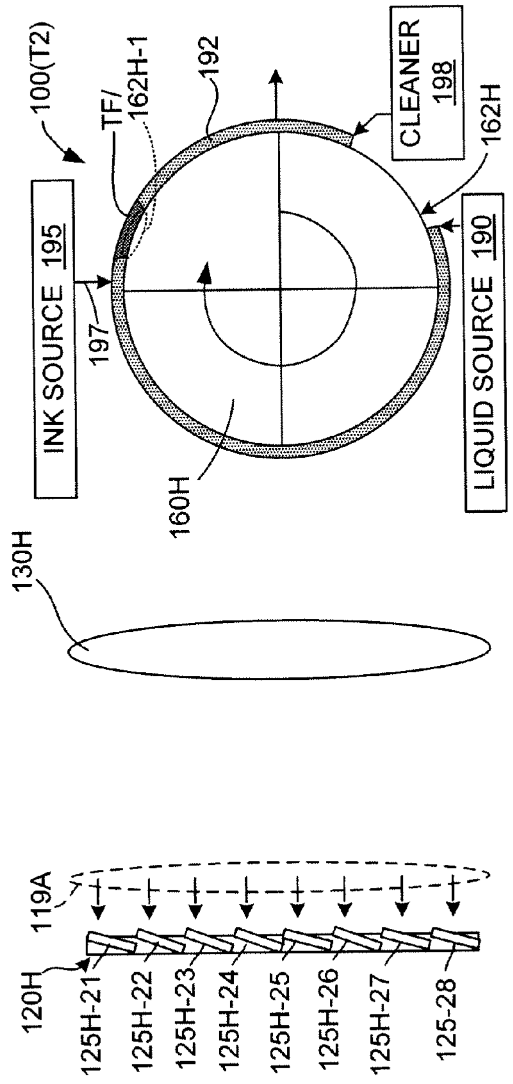
FIGS. 10(A), 10(B) and 10(C) are simplified side views showing the imaging system of FIG. 9 during an image transfer operation.
Figure 10B:
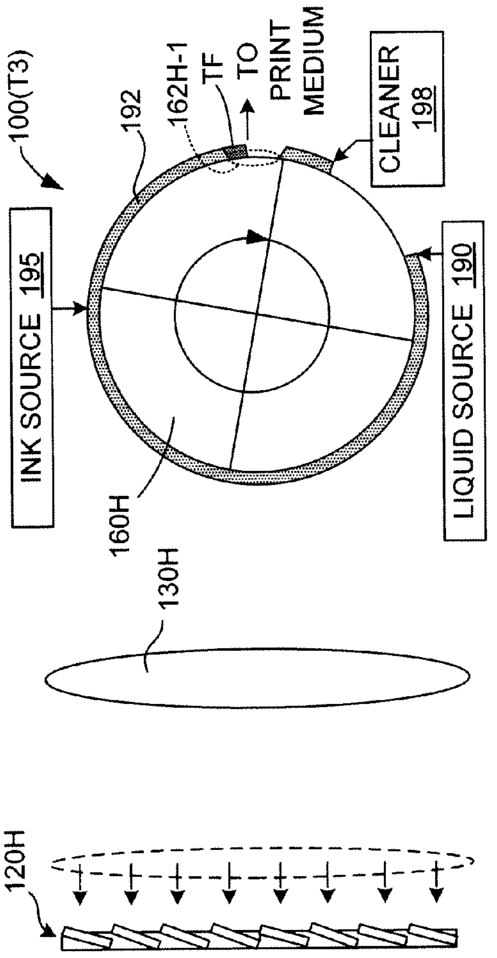
Figure 10C:
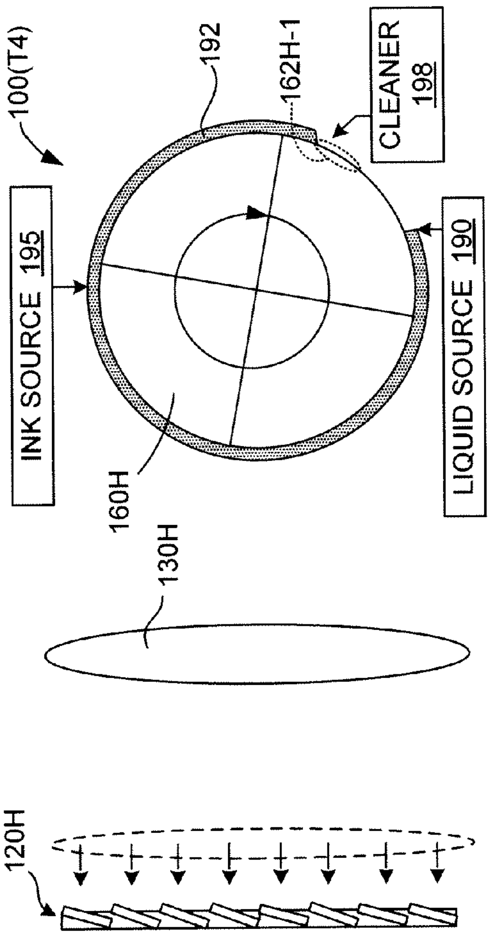

FIGS. 10(A), 10(B) and 10(C) show imaging system 100H at times subsequent to time T1, where spatial light modulator 120H is deactivated in order to how surface feature P12 (see FIG. 9) is subsequently utilized in accordance with the image transfer operation of imaging system 100H. Referring to FIG. 10(A), at a time T2 drum cylinder 160H has rotated such that surface region 162H-1 has passed under ink source 195. Due to the removal of fountain solution depicted in FIG. 9, ink material 197 adheres to exposed surface region 162H-1 to form an ink feature TF. Referring to FIG. 10(B), at a time T3 while ink feature TF is passing the transfer point, the weak adhesion between the ink material and surface region 162H-1 and the strong attraction of the ink material to the print medium (not shown) causes ink feature TF to transfer to the print medium, resulting in a "dot" in the ink printed on the print medium. At a subsequent T4, as indicated in FIG. 10(C), surface region 162H-1 is rotated under cleaning mechanism 198, which removes any residual ink and fountain solution material to prepare surface region 162H-1 for a subsequent exposure/print cycle. According to the above-described image transfer operation, ink material only transfers onto portions of imaging surface 162H that are exposed by the imaging process described above (i.e., ink material does not adhere to fountain solution 192), whereby ink material is only transferred to the print medium from portions of drum roller 160H that are subjected to concentrated light as described herein. Thus, variable data from fountain solution removal is transferred, instead of constant data from a plate as in conventional systems. For this process to work using a rastered light source (i.e., a light source that is rastered back and forth across the scan line), a single very high power light (e.g., laser) source would be required to sufficiently remove the fountain solution in real time. A benefit of the imaging operation of the present invention is that, because liquid is removed from the entire scan line simultaneously, an offset press configuration is provided at high speed using multiple relatively low power light sources.

The present invention will now be described with reference to certain specific anamorphic projection optical system embodiments. Each of the specific embodiments described below with reference to FIGS. 11-14 and 16-19 may be utilized in the various single-pass imaging systems described above (i.e., in place of the simplified optical systems described with reference to the single-pass imaging systems). In addition, the anamorphic projection optical system embodiments described herein may be utilized in any other apparatus or device that requires conversion of a low-intensity two-dimensional light field or image (e.g., a modulated light field) into a high-intensity line image.

Figure 11:
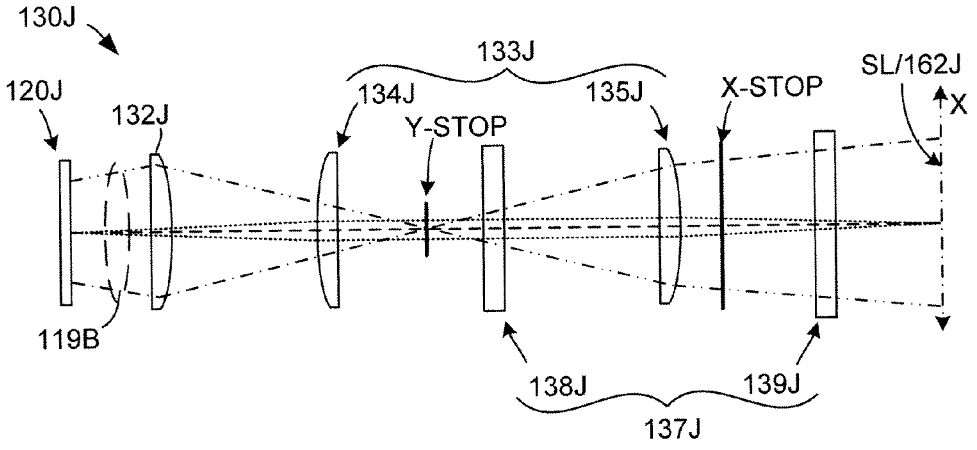
FIG. 11 is a simplified top view showing an all-refractive anamorphic optical system utilized by an imaging system according to another specific embodiment of the present invention.
Figure 12:
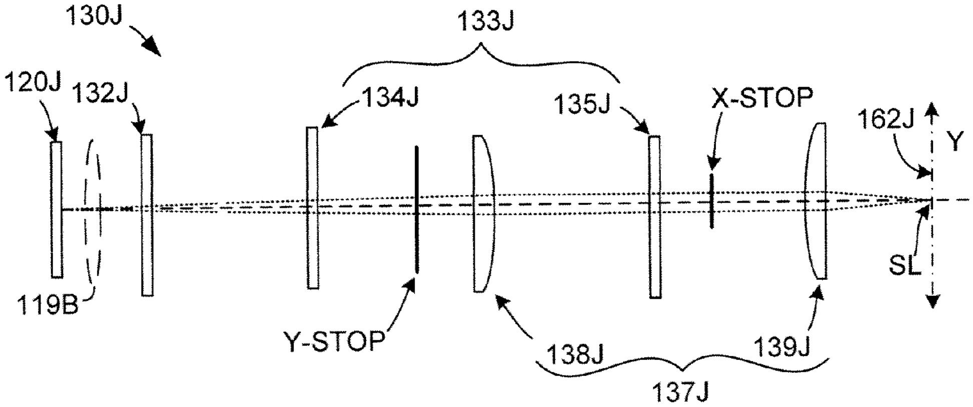
FIG. 12 is a simplified side view showing the all-refractive anamorphic optical system of FIG. 11.

FIGS. 11 and 12 are simplified top and side view diagrams showing an all-refractive anamorphic optical system 130J arranged in accordance with a first specific embodiment of the present invention. Anamorphic optical system 130J is depicted between a spatial light modulator 120J and an imaging surface 162J to illustrate an exemplary application of anamorphic optical system 130J in a single-pass imaging system, such as those described above. However, anamorphic optical system 130J is not limited to the particular single-pass imaging systems described below.

Referring to FIGS. 11 and 12, anamorphic optical system 130J includes a field lens 132J, a cross-process optical subsystem 133J and a process optical subsystem 137J. Cross-process optical subsystem 133J includes doublet (first and second) cylindrical/acylindrical lens elements 134J and 135J that are cooperatively shaped and arranged to image modulated light field 119B onto imaging surface 162J in the cross-process direction in a manner consistent with the ray trace (dashed) lines shown in FIG. 11. That is, doublet lens elements 134J and 135J have optical surfaces that have a constant curved profile centered along the neutral or zero-power axis that is parallel to the cross-process (X-axis) direction, and these lenses are positioned between spatial light modulator 120J and imaging surface 162J such that line image SL has a predetermined length in the process direction on imaging surface 162J. Optional collimating field lens 132J is a cross-process direction cylindrical/acylindrical lens that is positioned between spatial light modulator 120J and lens element 134J, and is cooperatively formed with lens element 134J to converge light in the cross-process (X-axis) direction at a point between doublet lens elements 134J and 135J, thereby enabling the positioning of an aperture Y-stop between doublet lens elements 134J and 135J. This arrangement enables efficient correction of aberrations using a low number of simple lenses, and also and minimizes the size of doublet lens elements 134J and 135J. Field lens 132J also serves to collimate the light portions that are slightly diverging off of the surface of the spatial light modulator 120J. Process optical subsystem 137J includes doublet (third and fourth) lens elements 138J and 139J that are cooperatively shaped and positioned to image and concentrate modulated light field 119B in the process (Y-axis) direction on imaging surface 162J in a manner consistent with the ray trace lines shown in FIG. 12. As the focusing power of lens 138J is increased, the intensity of the light on spatial light modulator 120J is reduced relative to the intensity of the line image SL. However, this means that cylindrical/acylindrical lens 138J must be placed closer to the imaging surface 162J.

Table 1 includes an optical prescription for the opposing surfaces of each optical element of optical system 130J. In all tables listed below, the surface of each element facing the optical system input (light source) is referred to as "S1", and the surface of each element facing the optical system output is referred to as "S2". For example, "132J: S1" refers to the surface of field lens 132J that faces spatial light modulator 120J. Curvature values are in 1/millimeter and thickness values are in millimeters. Note that both the light source (i.e., the surface of spatial light modulator 120J) and the target surface (i.e., imaging surface 162J) are assumed planar for purposes of the listed prescription. The optical prescription also assumes a light wavelength of 980 nm. The resulting optical system has a cross-process direction magnification of 1.4.

TABLE 1

| SURFACE | SHAPE | Y-CURVE | Y-RADIUS | X-CURVE | X-RADIUS | THICKNESS | GLASS TYPE |
|---|---|---|---|---|---|---|---|
| 132J: S1 | PLANO | 0.00000000 | INFINITY | 0.00000000 | INFINITY | 9.670 | BK7 |
| 132J: S2 | CONVEX | 0.01934236 | 51.700 | 0.00000000 | INFINITY | 111.880 | |
| 134J: S1 | CONVEX | 0.01289491 | 77.550 | 0.00000000 | INFINITY | 7.280 | BK7 |
| 134J: S2 | PLANO | 0.00000000 | INFINITY | 0.00000000 | INFINITY | 58.509 | |
| 138J: S1 | PLANO | 0.00000000 | INFINITY | 0.00000000 | INFINITY | 6.170 | BK7 |

TABLE 1-continued

| SURFACE | SHAPE | Y-CURVE | Y-RADIUS | X-CURVE | X-RADIUS | THICKNESS | GLASS TYPE |
|---|---|---|---|---|---|---|---|
| 138J: S2 | CONVEX | 0.00000000 | INFINITY | 0.00967118 | 103.400 | 8.000 | |
| Y-STOP | PLANO | 0.00000000 | INFINITY | 0.00000000 | INFINITY | 56.558 | |
| 135J: S1 | PLANO | 0.00000000 | INFINITY | 0.00000000 | INFINITY | 7.280 | BK7 |
| 135J: S2 | CONVEX | 0.01289491 | 77.550 | 0.00000000 | INFINITY | 20.368 | |
| X-STOP | PLANO | 0.00000000 | INFINITY | 0.00000000 | INFINITY | 64.043 | |
| 138J: S1 | CONVEX | 0.00000000 | INFINITY | 0.03075031 | 32.520 | 5.580 | BK7 |
| 138J: S2 | PLANO | 0.00000000 | INFINITY | 0.00000000 | INFINITY | 59.220 | |

Figure 13:
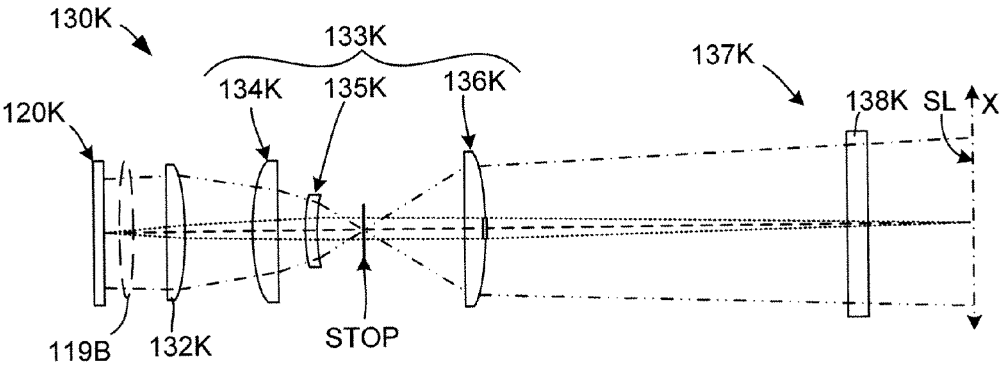
FIG. 13 is a simplified top view showing a second all-refractive anamorphic optical system utilized by an imaging system according to another specific embodiment of the present invention.
Figure 14:
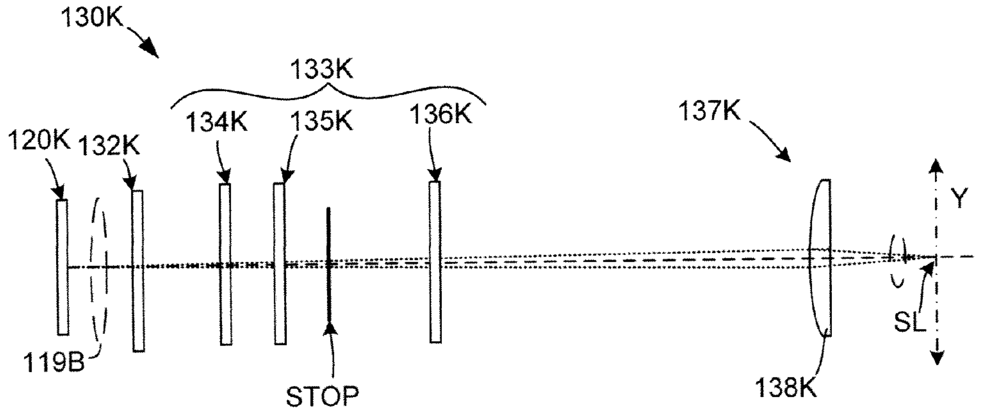
FIG. 14 is a simplified side view showing the all-refractive anamorphic optical system of FIG. 13.

FIGS. 13 and 14 are simplified top and side view diagrams showing a second all-refractive anamorphic optical system 130K arranged in accordance with a second specific embodiment of the present invention. Anamorphic optical system 130K is depicted between a spatial light modulator 120K and an imaging surface 162K, but may be used in other apparatus or devices as mentioned above. Anamorphic optical system 130K includes a field lens 132K, a cross-process optical subsystem 133K and a process optical subsystem 137K. Cross-process optical subsystem 133K includes triplet cylindrical/acylindrical lens elements 134K, 135K and 136K that are cooperatively shaped and arranged to image modulated light field 119B onto imaging surface 162K in the cross-process direction in the manner indicated by the ray trace lines in FIG. 13. Field lens 132K is a cross-process direction cylindrical/acylindrical lens that is positioned between spatial light modulator 120K and lens element 134K, and is cooperatively shaped and positioned with lens elements 134K and 135K to enable locating the aperture Y-stop between (second and third) lens elements 135K and 136K of cross-process optical subsystem 133K, providing benefits similar to those described above with reference to field lens 132J. Process optical subsystem 137K includes a single cylindrical/acylindrical lens element 138K that is shaped and arranged to image and concentrate modulated light field 119B in the process (Y-axis) direction onto imaging surface 162J in a manner consistent with the ray trace lines shown in FIG. 14. Table 2 includes an optical prescription for the opposing surfaces of each optical element of optical system 130K. The optical prescription assumes a light wavelength of 980 nm, and the resulting optical system has a cross-process direction magnification of 0.0725.

TABLE 2

| SURFACE | SHAPE | Y-CURVE | Y-RADIUS | X-CURVE | X-RADIUS | THICKNESS | GLASS TYPE |
|---|---|---|---|---|---|---|---|
| 132R: S1 | PLANO | 0.00000000 | INFINITY | 0.00000000 | INFINITY | 10.000 | BK7 |
| 132R: S2 | CONVEX | 0.02239886 | 44.645 | 0.00000000 | INFINITY | 75.729 | |
| 134R: S1 | CONVEX | 0.01076421 | 92.900 | 0.00000000 | INFINITY | 12.274 | SF10 |
| 134R: S2 | PLANO | 0.00000000 | INFINITY | 0.00000000 | INFINITY | 13.248 | |
| 135R: S1 | CONVEX | 0.03329329 | 30.036 | 0.00000000 | INFINITY | 5.000 | SF10 |
| 135R: S2 | CONCAVE | 0.03802478 | 26.299 | 0.00000000 | INFINITY | 22.000 | |
| STOP | PLANO | 0.00000000 | INFINITY | 0.00000000 | INFINITY | 155.962 | |
| 136R: S1 | PLANO | 0.00000000 | INFINITY | 0.00000000 | INFINITY | 12.274 | SF10 |
| 136R: S2 | CONVEX | 0.00552966 | 180.843 | 0.00000000 | INFINITY | 123.866 | |
| 138R | CONCAVE | 0.00000000 | INFINITY | 0.0019701 | 911.567 | 99.568 | MIRROR |
| 139R | CONCAVE | 0.00000000 | INFINITY | 0.00260405 | 384.018 | 193.169 | MIRROR |

Figure 15:
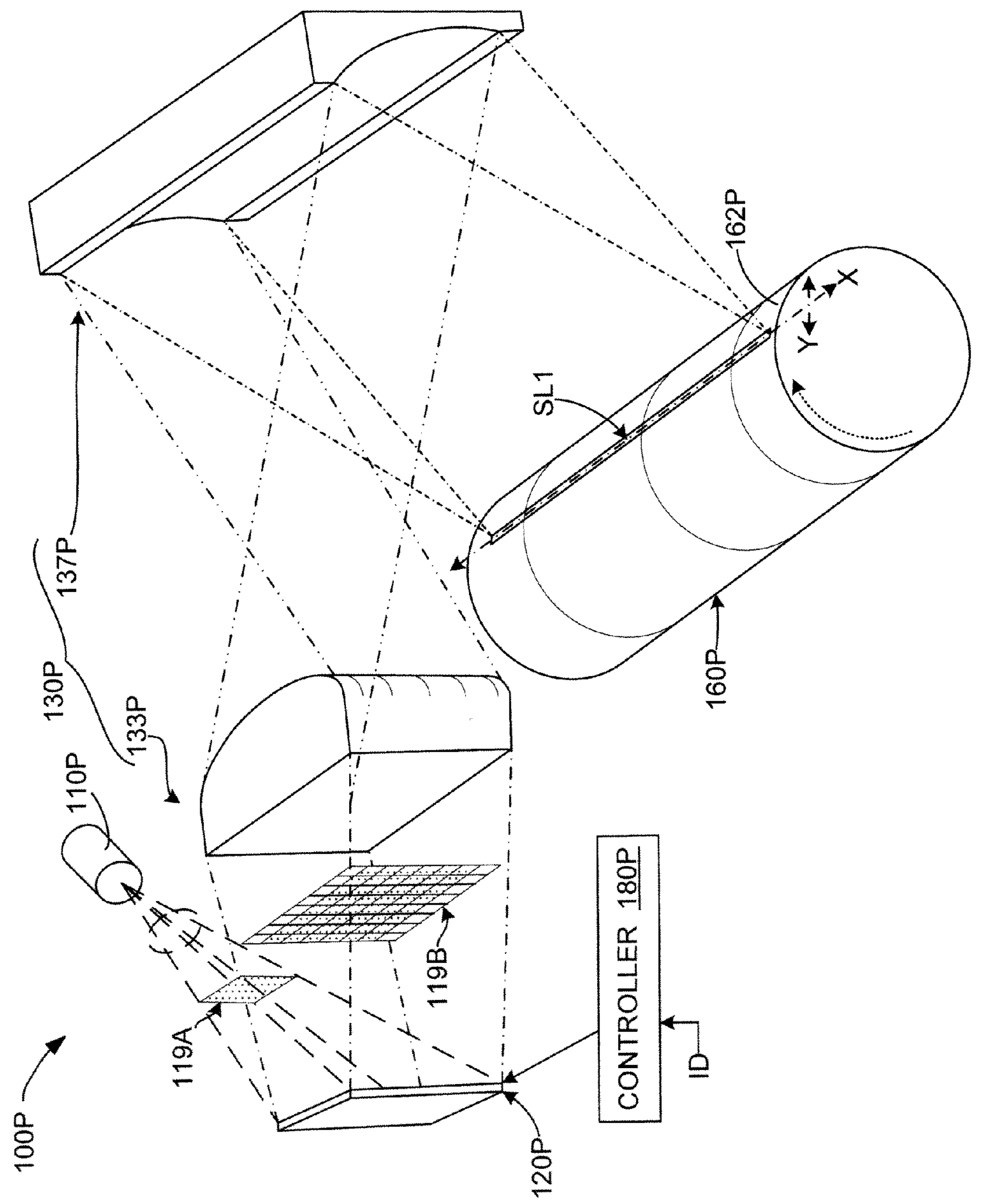
FIG. 15 is a perspective view showing an imaging system utilizing a DMD-type spatial light modulator and a catadioptric optical system in a folded arrangement according to another specific embodiment of the present invention.

FIG. 15 is a perspective view showing an imaging system 100P utilizing a homogenous light generator 110P and a DMD-type spatial light modulator 120P according to another specific embodiment of the present invention. Spatial light modulator 120P is essentially identical to DMD-type spatial light modulator 120G (described above), and is positioned at a compound angle relative to homogenous light generator 110P in order to generate modulated light field 119B in response to image data transmitted from a controller 180P in the manner similar to that described above. DMD-type imaging system 100P differs from the previous embodiments in that it utilizes a simplified catadiotropic anamorphic optical system 130P to generate a line image SL1 on imaging surface 162P of a drum roller 160P in a manner similar to that described above. That is, unlike the all-refractive anamorphic optical systems described above, catadiotropic anamorphic optical system 130P includes a cross-process optical subsystem 133P formed by one or more cylindrical/acylindrical lenses, and a process optical subsystem 137Q formed by one or more cylindrical/acylindrical mirrors. Due to process direction distortion, the catadiotropic anamorphic projection optical system is more suitable for imaging systems where the two-dimensional light field 119B is much wider in the cross-process direction that in the process direction. The catadioptric anamorphic optical system architecture illustrated in FIG. 15 and described in additional detail below with reference to FIGS. 16-19 also provides a lower level of sagittal field curvature along the cross-process direction than that of the all-refractive system, thereby facilitating the imaging of the square or rectangular modulated light fields shown and described above.

Figure 16:
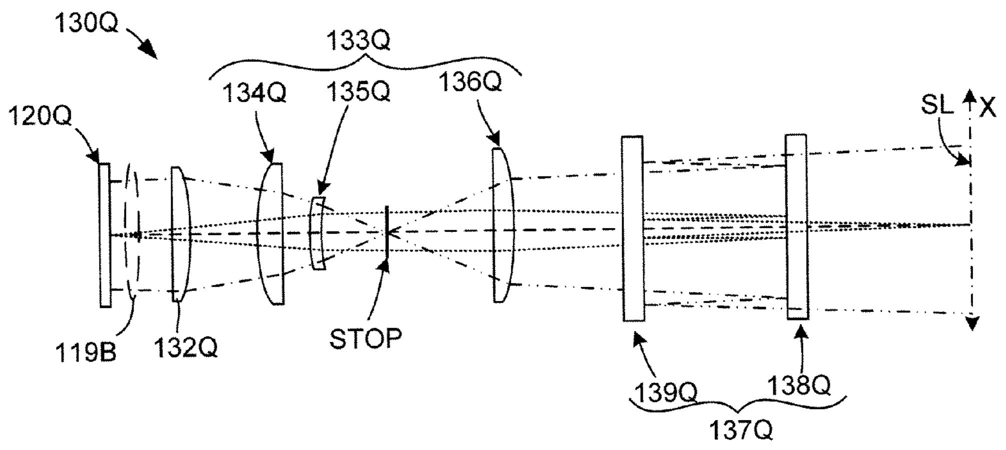
FIG. 16 is a simplified top view showing a catadioptric anamorphic optical system utilized by an imaging system according to another specific embodiment of the present invention.
Figure 17:
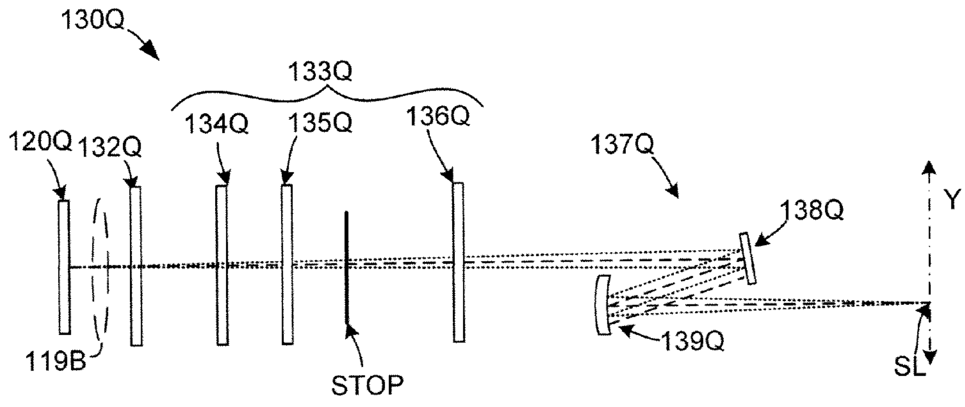
FIG. 17 is a simplified side view showing the catadioptric anamorphic optical system of FIG. 16.

FIGS. 16 and 17 are simplified top and side view diagrams showing a first catadiotropic anamorphic optical system 130Q arranged in accordance with a specific embodiment of the present invention. Optical system 130Q is depicted as forming a light path between a spatial light modulator 120Q and an imaging surface 162Q, but may be used in other apparatus or devices as mentioned above. Anamorphic optical system 130Q includes a field lens 132Q, a cross-process optical subsystem 133Q and a process optical subsystem 137Q. Cross-process optical subsystem 133Q includes triplet cylindrical/acylindrical lens elements 134Q, 135Q and 136Q that are cooperatively shaped and arranged to image modulated light field 119B onto imaging surface 162Q in the cross-process direction in the manner indicated by the ray trace lines in FIG. 16. Field lens 132Q is a cross-process direction cylindrical/acylindrical lens that is positioned between spatial light modulator 120Q and lens element 134Q, and is cooperatively shaped and positioned with lens elements 134Q and 135Q to enable locating the aperture stop between (second and third) lens elements 135Q and 136Q, thereby providing benefits similar to those described above with reference to field lens 132J. Process optical subsystem 137Q includes a separated fold (flat) mirror 138Q and a cylindrical/acylindrical mirror 139Q that is shaped and arranged to image and concentrate modulated light field 119B in the process (Y-axis) direction onto imaging surface 162Q in a manner consistent with the ray trace lines shown in FIG. 17. Table 3 includes an optical prescription for the opposing surfaces of each optical element of catadiotropic anamorphic optical system 130Q. The optical prescription assumes a light wavelength of 980 nm, and the resulting optical system has a cross-process direction magnification of 0.33.

TABLE 3

| SURFACE | SHAPE | Y-CURVE | Y-RADIUS | X-CURVE | X-RADIUS | THICKNESS | GLASS TYPE |
|---|---|---|---|---|---|---|---|
| 132Q: S1 | PLANO | 0.00000000 | INFINITY | 0.00000000 | INFINITY | 10.000 | BK7 |
| 132Q: S2 | CONVEX | 0.01903430 | 52.537 | 0.00000000 | INFINITY | 73.983 | |
| 134Q: S1 | CONVEX | 0.01044659 | 95.725 | 0.00000000 | INFINITY | 12.500 | SF10 |
| 134Q: S2 | PLANO | 0.00000000 | INFINITY | 0.00000000 | INFINITY | 12.912 | |
| 135Q: S1 | CONVEX | 0.03279483 | 30.493 | 0.00000000 | INFINITY | 5.000 | SF10 |
| 135Q: S2 | CONCAVE | 0.03729411 | 26.814 | 0.00000000 | INFINITY | 45.000 | |
| STOP | PLANO | 0.00000000 | INFINITY | 0.00000000 | INFINITY | 120.726 | |
| 136Q: S1 | PLANO | 0.00000000 | INFINITY | 0.00000000 | INFINITY | 12.500 | SF10 |
| 136Q: S2 | CONVEX | 0.00564295 | 177.212 | 0.00000000 | INFINITY | 146.217 | |
| 138Q | PLANO | 0.00000000 | INFINITY | 0.00000000 | INFINITY | −125.00 | MIRROR |
| 139Q | CONCAVE | 0.00000000 | INFINITY | 0.00349853 | 285.834 | 189.156 | MIRROR |

Figure 18:
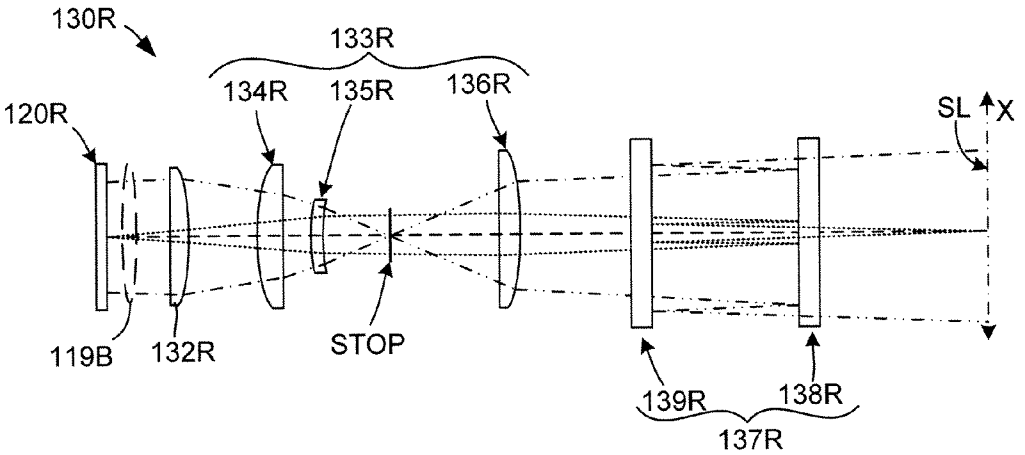
FIG. 18 is a simplified top view showing a second catadioptric anamorphic optical system utilized by an imaging system according to another specific embodiment of the present invention.
Figure 19:
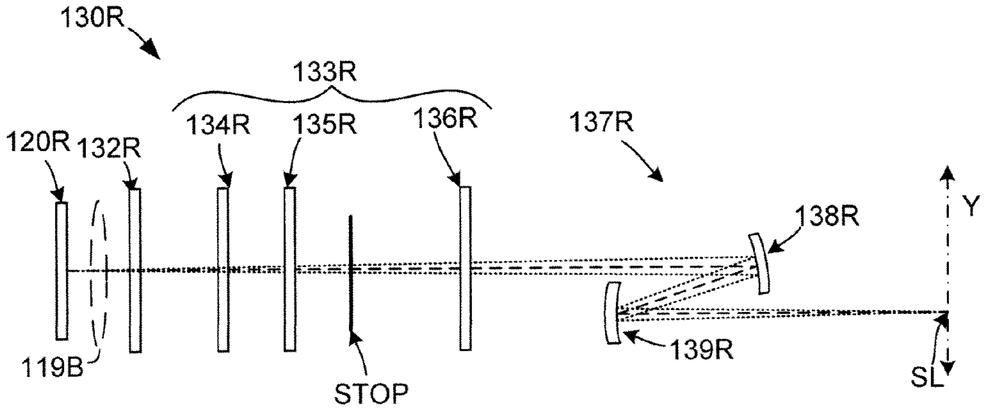
FIG. 19 is a simplified side view showing the all-refractive anamorphic optical system of FIG. 18.

FIGS. 18 and 19 are simplified top and side view diagrams showing a second catadiotropic anamorphic optical system 130R arranged in accordance with another specific embodiment of the present invention. Optical system 130R forms a light path between a spatial light modulator 120R and an imaging surface 162R, but may be used in other apparatus or devices as mentioned above. Anamorphic optical system 130R includes a field lens 132R, a cross-process optical subsystem 133R and a process optical subsystem 137R. Cross-process optical subsystem 133R includes triplet cylindrical/acylindrical lens elements 134R, 135R and 136R that are cooperatively shaped and arranged to image modulated light field 119B onto imaging surface 162R in the cross-process direction in the manner indicated by the ray trace lines in FIG. 18. Field lens 132R is a cross-process direction cylindrical/acylindrical lens that is positioned between spatial light modulator 120R and lens element 134R, and is cooperatively shaped and positioned with lens elements 134R and 135R to enable locating the aperture stop between (second and third) lens elements 135R and 136R, thereby providing benefits similar to those described above with reference to field lens 132J. Process optical subsystem 137R includes (first and second) cylindrical/acylindrical mirrors 138Q and 139Q that are cooperatively shaped and arranged to image and concentrate modulated light field 119B in the process (Y-axis) direction onto imaging surface 162R in a manner consistent with the ray trace lines shown in FIG. 19. Table 4 includes an optical prescription for the opposing surfaces of each optical element of catadiotropic anamorphic optical system 130R. The optical prescription assumes a light wavelength of 980 nm, and the resulting optical system has a cross-process direction magnification of 0.44.

TABLE 4

| SURFACE | SHAPE | Y-CURVE | Y-RADIUS | X-CURVE | X-RADIUS | THICKNESS | GLASS TYPE |
|---|---|---|---|---|---|---|---|
| 132R: S1 | PLANO | 0.00000000 | INFINITY | 0.00000000 | INFINITY | 10.000 | BK7 |
| 132R: S2 | CONVEX | 0.02239886 | 44.645 | 0.00000000 | INFINITY | 75.729 | |
| 134R: S1 | CONVEX | 0.01076421 | 92.900 | 0.00000000 | INFINITY | 12.274 | SF10 |
| 134R: S2 | PLANO | 0.00000000 | INFINITY | 0.00000000 | INFINITY | 13.248 | |
| 135R: S1 | CONVEX | 0.03329329 | 30.036 | 0.00000000 | INFINITY | 5.000 | SF10 |
| 135R: S2 | CONCAVE | 0.03802478 | 26.299 | 0.00000000 | INFINITY | 22.000 | |
| STOP | PLANO | 0.00000000 | INFINITY | 0.00000000 | INFINITY | 155.962 | |
| 136R: S1 | PLANO | 0.00000000 | INFINITY | 0.00000000 | INFINITY | 12.274 | SF10 |
| 136R: S2 | CONVEX | 0.00552966 | 180.843 | 0.00000000 | INFINITY | 123.866 | |
| 138R | CONCAVE | 0.00000000 | INFINITY | 0.0019701 | 911.567 | 99.568 | MIRROR |
| 139R | CONCAVE | 0.00000000 | INFINITY | 0.00260405 | 384.018 | 193.169 | MIRROR |

Although the present invention has been described with respect to certain specific embodiments, it will be clear to those skilled in the art that the inventive features of the present invention are applicable to other embodiments as well, all of which are intended to fall within the scope of the present invention. For example, although the present invention is illustrated as having light paths that are linear (see FIG. 1) or with having one fold (see FIG. 8), other arrangements may be contemplated by those skilled in the art that include folding along any number of arbitrary light paths. In addition, the methods described above for generating a high energy line image may be achieved using devices other than those described herein.

The invention claimed is:

1. An anamorphic optical projection system for anamorphically imaging and concentrating a two-dimensional light field to generate a substantially one-dimensional line image that extends in a cross-process direction on an imaging surface, the optical projection system comprising:

a cross-process optical subsystem including at least one cross-process cylindrical/acylindrical optical element arranged to image said two-dimensional light field in a cross-process direction on the imaging surface, the cross-process direction being perpendicular to the process direction; and a process-direction optical subsystem including at least one process-direction cylindrical/acylindrical optical element arranged to focus said two-dimensional light field in the process direction on the imaging surface, wherein the two-dimensional light field has a first width in the cross-process direction and a first height in the process direction, and wherein the process-direction optical subsystem comprises at least one cylindrical/acylindrical lens that is shaped and positioned to concentrate the two-dimensional light field in the process direction onto the imaging surface in the process direction such that said substantially one-dimensional line image has a second height in the process direction that is at least three times smaller than the first height of the two-dimensional light field.

2. An anamorphic optical projection system for anamorphically imaging and concentrating a two-dimensional light field to generate a substantially one-dimensional line image that extends in a cross-process direction on an imaging surface, the optical projection system comprising:

a cross-process optical subsystem including at least one cross-process cylindrical/acylindrical optical element arranged to image said two-dimensional light field in a cross-process direction on the imaging surface, the cross-process direction being perpendicular to the process direction; and a process-direction optical subsystem including at least one process-direction cylindrical/acylindrical optical element arranged to focus said two-dimensional light field in the process direction on the imaging surface, wherein the light field has a first width in the cross-process direction and a first height in the process direction, and wherein the process-direction optical subsystem comprises at least one cylindrical/acylindrical mirror that is shaped and positioned to concentrate the two-dimensional light field in the process direction onto the imaging surface such said substantially one-dimensional line image has a second width in the cross-process that is equal to or greater than the first width of the two-dimensional light field.

3. The optical system according to claim 1, wherein the process-direction optical subsystem is disposed between the cross-process optical subsystem and the imaging surface.

4. The optical system according to claim 3, wherein the cross-process optical subsystem comprises a first cylindrical/acylindrical lens and a second cylindrical/acylindrical lens that are cooperatively shaped and positioned to image the two-dimensional light field in the cross-process direction on the imaging surface.

5. The optical system according to claim 4, wherein the optical system further comprises a collimating cylindrical/acylindrical field lens disposed such that the first cylindrical/acylindrical lens is located between the field lens and the second cylindrical/acylindrical lens, and wherein the field lens, the first cylindrical/acylindrical lens and the second cylindrical/acylindrical lens are cooperatively shaped and positioned to image the two-dimensional light field in the cross-process direction on the imaging surface.

6. The optical system according to claim 5, wherein the optical system further comprises an aperture stop disposed between the first cylindrical/acylindrical lens and the second cylindrical/acylindrical lens, and wherein the field lens and the first cylindrical/acylindrical lens are cooperatively shaped and positioned such that imaged light is converged in the cross-process direction through the aperture stop.

7. The optical system according to claim 6, wherein the process-direction optical subsystem comprises a third cylindrical/acylindrical lens and a fourth cylindrical/acylindrical lens that are cooperatively shaped and positioned to image the two-dimensional modulated light field in the process direction on the imaging surface.

8. The optical system according to claim 3, wherein the cross-process optical subsystem comprises a first cylindrical/acylindrical lens, a second cylindrical/acylindrical lens and a third cylindrical/acylindrical lens that are cooperatively shaped and positioned to image the two-dimensional modulated light field in the cross-process direction on the imaging surface.

9. The optical system according to claim 8, wherein the optical system further comprises a collimating cylindrical/acylindrical field lens disposed such that the first cylindrical/acylindrical lens is located between the field lens and the second cylindrical/acylindrical lens, and wherein the field lens, the first cylindrical/acylindrical lens, the second cylindrical/acylindrical lens and the third cylindrical/acylindrical lens are cooperatively shaped and positioned to image the two-dimensional modulated light field in the cross-process direction on the imaging surface.

10. The optical system according to claim 9, wherein the optical system further comprises an aperture stop disposed between the second cylindrical/acylindrical lens and the third cylindrical/acylindrical lens, and wherein the field lens, the first cylindrical/acylindrical lens and the second cylindrical/acylindrical lens are cooperatively shaped and positioned such that the imaged two-dimensional modulated light field is converged in the cross-process direction through the aperture stop.

11. The optical system according to claim 10, wherein the process-direction optical subsystem comprises a fourth cylindrical/acylindrical lens that is shaped and positioned to image the two-dimensional modulated light field in the process direction on the imaging surface.

12. The optical system according to claim 2, wherein the process-direction optical subsystem further comprises a flat fold mirror positioned between the cross-process optical subsystem and the cylindrical/acylindrical mirror.

13. The optical system according to claim 2, wherein the process-direction optical subsystem comprises a first cylindrical/acylindrical mirror and a second cylindrical/acylindrical mirror that are cooperatively shaped and positioned to concentrate the two-dimensional light field in the process direction on the imaging surface.

14. The optical system according to claim 2, wherein the cross-process optical subsystem comprises a first cylindrical/acylindrical lens and a second cylindrical/acylindrical lens that are cooperatively shaped and positioned to image the two-dimensional light field in the cross-process direction on the imaging surface.

15. The optical system according to claim 2, wherein the cross-process optical subsystem comprises a first cylindrical/acylindrical lens, a second cylindrical/acylindrical lens and a third cylindrical/acylindrical lens that are cooperatively shaped and positioned to image the two-dimensional modulated light field in the cross-process direction on the imaging surface.

16. An anamorphic optical projection system for anamorphically imaging and concentrating a two-dimensional light field to generate a substantially one-dimensional line image that extends in a cross-process direction on an imaging surface, the optical projection system comprising:

a collimating cylindrical/acylindrical field lens;

a cross-process optical subsystem including first and second cylindrical/acylindrical lens elements cooperatively arranged with said field lens to image said two-dimensional light field in a cross-process direction on the imaging surface, the cross-process direction being perpendicular to the process direction, the first cylindrical/acylindrical lens element being located between the second cylindrical/acylindrical lens element and the field lens; and a process-direction optical subsystem including a cylindrical/acylindrical optical element arranged to focus said two-dimensional light field in the process direction on the imaging surface, the cylindrical/acylindrical optical element being located between the second cylindrical/acylindrical lens element and the imaging surface, wherein the light field has a first width in the cross-process direction and a first height in the process direction, and wherein the process-direction optical subsystem comprises at least one cylindrical/acylindrical mirror that is shaped and positioned to concentrate the two-dimensional light field in the process direction onto the imaging surface such said substantially one-dimensional line image has a second width in the cross-process that is equal to or greater than the first width of the two-dimensional light field.

17. The optical system according to claim 16, wherein the process-direction optical subsystem further comprises at least one of a flat fold mirror and a second cylindrical/acylindrical mirror.

18. An anamorphic optical projection system for anamorphically imaging and concentrating a two-dimensional light field to generate a substantially one-dimensional line image that extends in a cross-process direction on an imaging surface, the modulated light field having a first width in the cross-process direction and a first height in the process direction, the optical projection system comprising:

a cross-process optical subsystem including at least one cross-process cylindrical/acylindrical lens element arranged to image said two-dimensional light field in a cross-process direction on the imaging surface such said substantially one-dimensional line image has a second width in the cross-process that is equal to or greater than the first width of the two-dimensional modulated light field; and a process-direction optical subsystem including at least one process-direction cylindrical/acylindrical lens element arranged to image and concentrate the imaged light received from the cross-process optical subsystem in the process direction such that said substantially one-dimensional line image has a second height in the process direction that is at least three times smaller than the first height of the two-dimensional modulated light field.

* * * * *